US012356406B2

(12) United States Patent
Khoshnevisan et al.

(10) Patent No.: US 12,356,406 B2
(45) Date of Patent: Jul. 8, 2025

(54) DOWNLINK ASSIGNMENT INDEX OPERATION FOR CONTROL CHANNEL REPETITION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 817 days.

(21) Appl. No.: 17/451,384

(22) Filed: Oct. 19, 2021

(65) Prior Publication Data

US 2022/0124774 A1 Apr. 21, 2022

Related U.S. Application Data

(60) Provisional application No. 63/198,481, filed on Oct. 21, 2020.

(51) Int. Cl.
*H04W 72/21* (2023.01)
*H04B 7/0417* (2017.01)
(Continued)

(52) U.S. Cl.
CPC .......... *H04W 72/21* (2023.01); *H04B 7/0417* (2013.01); *H04L 1/001* (2013.01); *H04L 5/0055* (2013.01); *H04W 72/23* (2023.01)

(58) Field of Classification Search
None
See application file for complete search history.

(56) References Cited

U.S. PATENT DOCUMENTS 12,068,866 B2 * 8/2024 Lee ................ H04L 1/1861
2017/0238287 A1 * 8/2017 Kusashima ........... H04W 72/12
370/280
(Continued)

FOREIGN PATENT DOCUMENTS

CN 110061816 A 7/2019
CN 110351027 A 10/2019
(Continued)

OTHER PUBLICATIONS

CAICT: "Potential enhancements to PDCCH for URLLC", 3GPP Draft, R1-1901129, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593973, 4 Pages, Retrieved from the Internet: URL:http://www.3gpp.org/ftp/Meetings%5F3GPP%5FSYNC/RAN1/Docs/R1%2D1901129%2Ezip [retrieved on Jan. 20, 2019] the whole document.

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a user equipment (UE) may monitor a first control channel candidate for first downlink control information (DCI) scheduling a data channel and a second control channel candidate for second DCI scheduling the data channel, wherein the first control channel candidate and the second control channel candidate are associated with a control channel repetition scheme. The UE may transmit a feedback codebook regarding the data channel based at least in part on monitoring the first control channel candidate and the second control channel candidate, (Continued)

wherein the feedback codebook includes one of: a single position corresponding to the data channel, or a first position corresponding to the first DCI on the first control channel candidate and a second position corresponding to the second DCI on the second control channel candidate. Numerous other aspects are provided.

30 Claims, 14 Drawing Sheets

(51) Int. Cl.
*H04L 1/00* (2006.01)
*H04L 5/00* (2006.01)
*H04W 72/23* (2023.01)

(56) References Cited

U.S. PATENT DOCUMENTS

| | | | |
|---|---|---|---|
| 2018/0160400 A1* | 6/2018 | Liu | H04L 1/0001 |
| 2018/0167915 A1* | 6/2018 | Lee | H04W 72/23 |
| 2019/0349960 A1* | 11/2019 | Li | H04L 5/0055 |
| 2020/0036480 A1 | 1/2020 | Yang et al. | |
| 2021/0160879 A1* | 5/2021 | Lin | H04W 72/0453 |
| 2022/0015082 A1* | 1/2022 | Farag | H04B 7/088 |
| 2022/0060276 A1* | 2/2022 | Chen | H04L 1/1867 |
| 2022/0086659 A1* | 3/2022 | Wang | H04W 52/0235 |
| 2022/0095317 A1* | 3/2022 | Papasakellariou | H04L 5/0055 |
| 2023/0114685 A1* | 4/2023 | Khoshnevisan | H04W 72/23 370/329 |

FOREIGN PATENT DOCUMENTS

| | | |
|---|---|---|
| WO | 2017045499 A1 | 3/2017 |
| WO | 2020026297 A1 | 2/2020 |
| WO | 2020042528 A1 | 3/2020 |
| WO | 2020091080 A1 | 5/2020 |
| WO | 2021047618 A1 | 3/2021 |
| WO | 2021066536 A1 | 4/2021 |

OTHER PUBLICATIONS

International Search Report and Written Opinion—PCT/US2021/071943—ISA/EPO—Feb. 9, 2022.
Fujitsu: "PDCCH Repetition for URLLC Transmissions", 3GPP TSG RAN WG1 Meeting #92bis, R1-1803943, Sanya, China, Apr. 16-20, 2018, Apr. 7, 2018, pp. 1-4.
Huawei, et al., "PDCCH Enhancements for URLLC", 3GPP TSG RAN WG1 Meeting #95, R1-1812221, Spokane, USA, Nov. 12-16, 2018, Nov. 3, 2018, 11 Pages.

* cited by examiner

DOWNLINK ASSIGNMENT INDEX OPERATION FOR CONTROL CHANNEL REPETITION

CROSS-REFERENCE TO RELATED APPLICATION

This patent application claims priority to U.S. Provisional Patent Application No. 63/198,481, filed on Oct. 21, 2020, entitled "DOWNLINK ASSIGNMENT INDEX OPERATION FOR CONTROL CHANNEL REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for downlink assignment index (DAI) operation for control channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP), though other standards are anticipated in which the concept of the present invention may apply.

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes monitoring a first control channel candidate for first downlink control information (DCI) scheduling a data channel and a second control channel candidate for second DCI scheduling the data channel (e.g., the first DCI and the second DCI may be the same DCI or may be different DCI), wherein the first control channel candidate and the second control channel candidate are associated with a control channel repetition scheme; and transmitting a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, a method of wireless communication performed by a base station includes transmitting, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and receiving a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, a UE for wireless communication includes a memory; and one or more processors coupled to the memory, the memory and the one or more processors configured to: monitor a first control channel candidate for first DCI scheduling a data channel and a second control channel candidate for second DCI scheduling the data channel, wherein the first control channel candidate and the second control channel candidate are associated with a control channel repetition scheme; and transmit a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, a base station for wireless communication includes a memory; and one or more processors coupled to the memory, the memory and the one or more processors configured to: transmit, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and receive a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, a non-transitory computer-readable medium storing a set of instructions for wireless communication includes one or more instructions that, when executed by one or more processors of a UE, cause the UE to: monitor a first control channel candidate for first DCI scheduling a data channel and a second control channel candidate for second DCI scheduling the data channel, wherein the first control channel candidate and the second control channel candidate are associated with a control channel repetition scheme; and transmit a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, a non-transitory computer-readable medium storing a set of instructions for wireless communication includes one or more instructions that, when executed by one or more processors of a base station, cause the base station to: transmit, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and receive a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, an apparatus for wireless communication includes means for monitoring a first control channel candidate for first DCI scheduling a data channel and a second control channel candidate for second DCI scheduling the data channel, wherein the first control channel candidate and the second control channel candidate are associated with a control channel repetition scheme; and means for transmitting a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

In some aspects, an apparatus for wireless communication includes means for transmitting, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and means for receiving a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
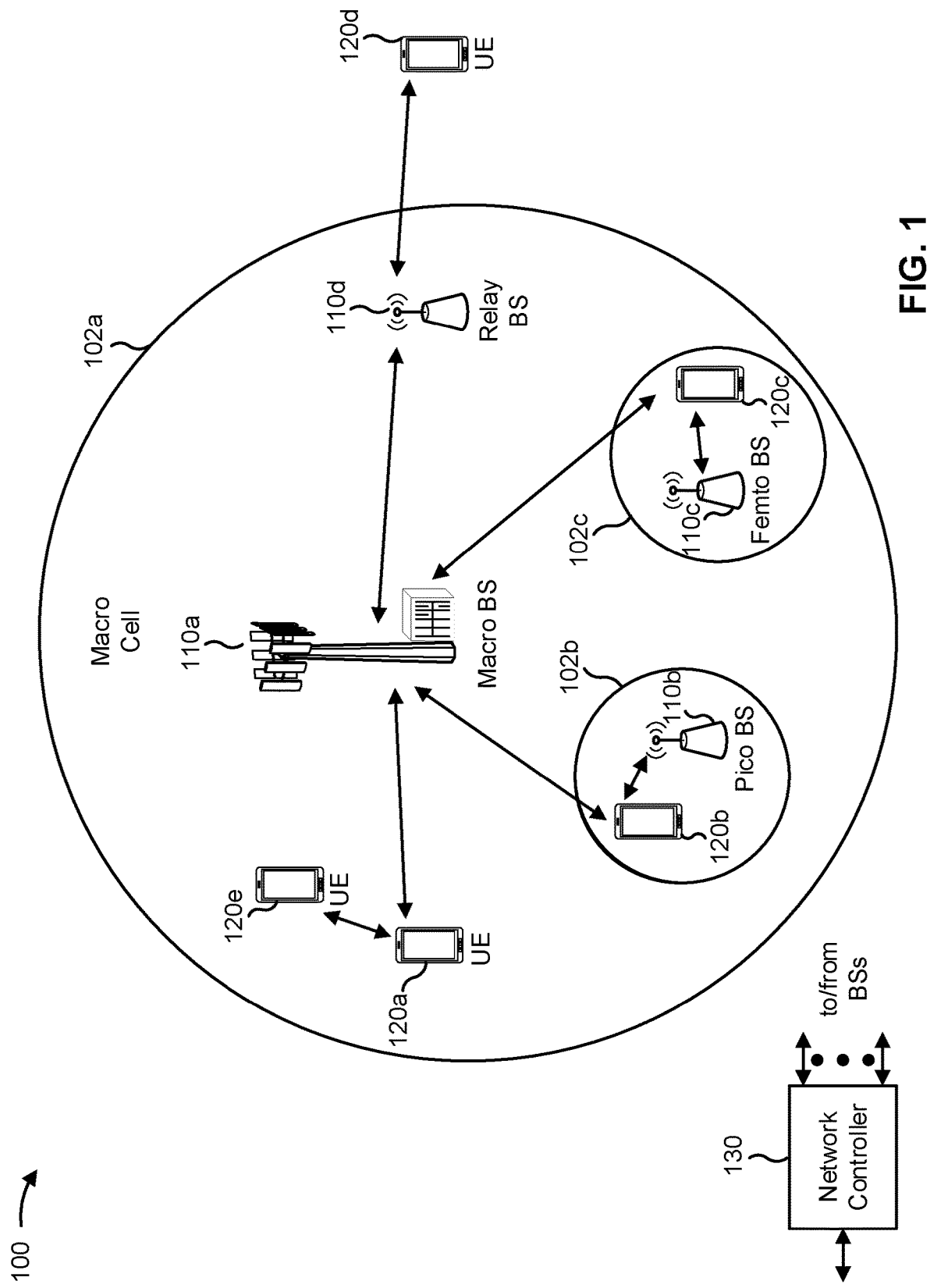
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
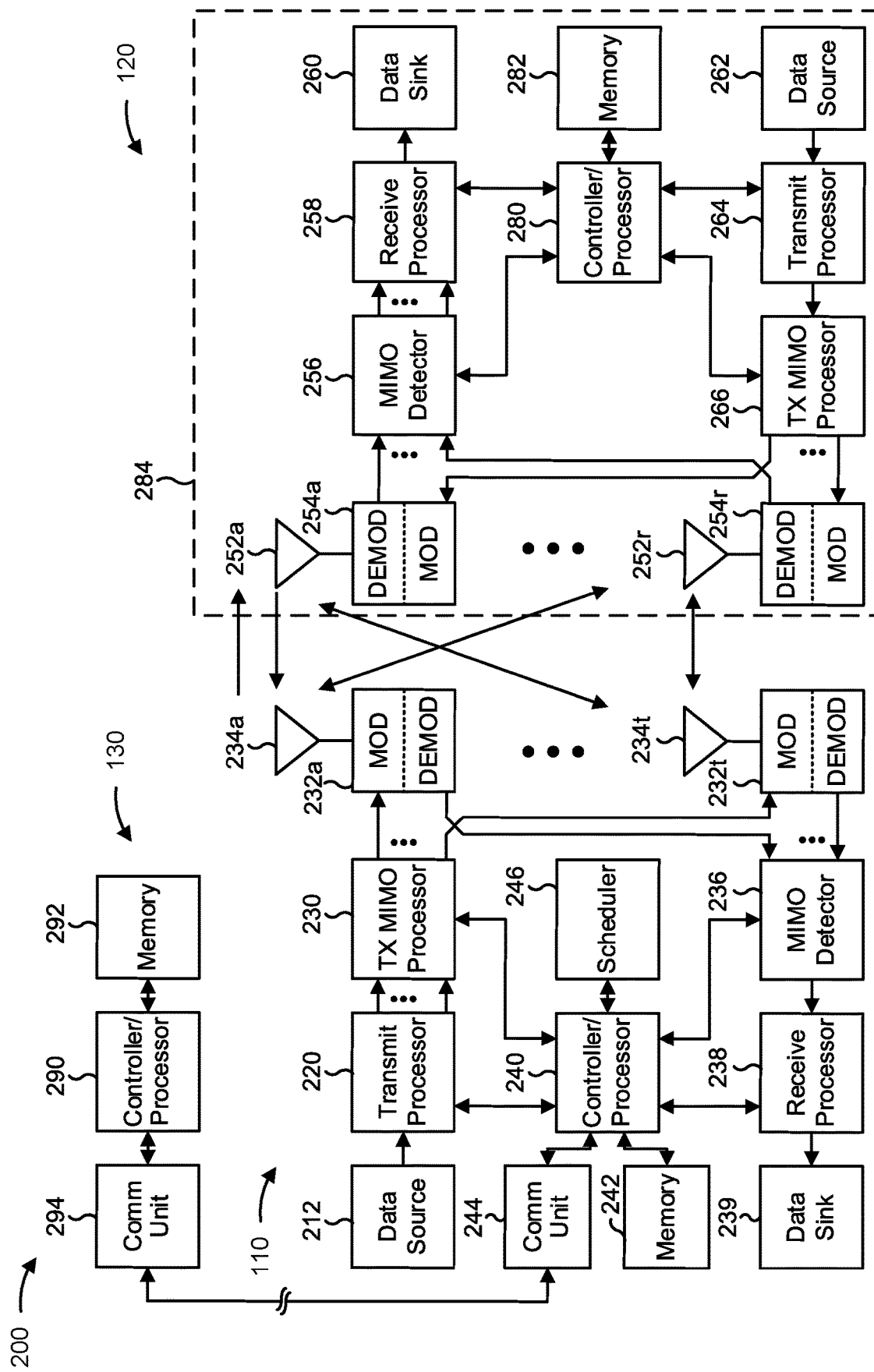
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254a through 254r, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-14).

At base station 110, the uplink signals from UE 120 and other UEs may be received by antennas 234a through 234t, processed by demodulators 232a through 232t, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232a through 232t, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-14).

Controller/processor 240 of base station 110, controller/processor 280 of UE 120, and/or any other component(s) of FIG. 2 may perform one or more techniques associated with downlink assignment index (DAI) operation for control channel repetition, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE includes means for monitoring a first control channel candidate for first downlink control information (DCI) scheduling a data channel and a second control channel candidate for second DCI scheduling the data channel, wherein the first control channel candidate and the second control channel candidate are associated with a control channel repetition scheme; and/or means for transmitting a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining an error case associated with the first DCI and the second DCI.

In some aspects, the UE includes means for successfully decoding the first DCI and the second DCI, wherein the first feedback information and the second feedback information indicate a result of decoding the data channel.

In some aspects, the UE includes means for successfully decoding the first DCI and the second DCI, wherein the first feedback information indicates a result of decoding the data channel and the second feedback information indicates a negative acknowledgment.

In some aspects, the UE includes means for successfully decoding only the first DCI and not the second DCI, wherein the first feedback information indicates a result of decoding the data channel and the second feedback information indicates a negative acknowledgment associated with the second DCI.

In some aspects, the base station includes means for transmitting, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and/or means for receiving a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for determine an error case associated with the first DCI and the second DCI.

In some aspects, the base station includes means for determine an error case associated with the first DCI and the second DCI.

In some aspects, the base station includes means for means for determining an error case associated with the first DCI and the second DCI.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

The hybrid automatic repeat request (HARQ) acknowledgment (ACK) system provides a mechanism for a UE to provide feedback (also referred to as HARQ-Ack feedback) indicating whether certain transmissions have been received by the UE. For example, the UE may provide HARQ feedback indicating an ACK value when a transmission has been received by the UE, and may provide HARQ feedback indicating a negative ACK (NACK) value when the transmission has not been received by the UE or was unsuccessfully received.

In some cases, a UE may determine HARQ feedback using a HARQ codebook. For example, the UE may determine whether a set of transmissions were successfully received, may add bits indicating ACKs or NACKs to the codebook in a particular order to indicate which transmissions of the set of transmissions were successfully received, and may generate HARQ feedback using the codebook. For example, the UE may transmit the codebook as the HARQ feedback, or the HARQ feedback may include the codebook. Thus, the codebook may be referred to as a feedback codebook.

As one example, the UE may determine whether downlink control information (DCI) and corresponding data transmissions are received successfully, and the UE may provide HARQ feedback indicating which DCI and corresponding data transmissions were received successfully. In this case, the UE may determine a HARQ codebook based at least in part on physical downlink control channel (PDCCH) monitoring occasions of the DCI and downlink (DL) assignment indexes (DAIs) associated with the DCI. A PDCCH monitoring occasion is based at least in part on a configuration of a search space set for a cell. A PDCCH monitoring occasion may include one or more PDCCH candidates (e.g., based at least in part on one or more aggregation levels). A PDCCH candidate is a set of resources that may include a PDCCH. The UE may search for a PDCCH carrying a DCI in one or more PDCCH candidates of a search space set (e.g., a PDCCH monitoring occasion). In some aspects, the DCI may carry scheduling information, such as scheduling information indicating a data channel (e.g., a physical downlink shared channel (PDSCH)).

For example, the PDCCH monitoring occasions may be based at least in part on configurations of different search space sets in different cells. The UE may use the union of PDCCH monitoring occasions across all active DL bandwidth parts (BWPs) of configured serving cells, ordered in ascending order of start time of the search space set associated with a PDCCH monitoring occasion. If two search space sets are associated with the same start time, the two search space sets may be counted as a single PDCCH monitoring occasion.

The UE may receive the DAIs in the DCI (such as in the downlink grant associated with the DCI). The DAIs may include counter DAIs (sometimes abbreviated as cDAIs) and total DAIs (sometimes abbreviated as tDAIs). A cDAI may indicate a cumulative number of serving cell and PDCCH monitoring occasion pairs in which DL DCIs have been sent by the base station, up to the current serving cell and current PDCCH monitoring occasion. A tDAI may be used when multiple serving cells are present, such as in carrier aggregation. The tDAI may indicate the total number of serving cell and PDCCH monitoring occasion pairs in which DL DCIs have been transmitted by the base station, up to the current PDCCH monitoring occasion. Thus, the same tDAI monitoring value may be used for all DCIs in the same PDCCH monitoring occasion. This provides protection against missing a DCI corresponding to the last serving cell in a particular PDCCH monitoring occasion, since the tDAI would inform the UE that one more DCI is to be expected than has been received according to the cDAI. The cDAI and tDAI for a particular DCI is expressed herein as {cDAI, tDAI} or (cDAI, tDAI).

If no DL DCI is missed, then ACK/NACKs corresponding to the received PDSCHs may be placed in a feedback codebook in the same order as the cDAI. If a DL DCI is missed, then a NACK may be placed in the codebook in the position corresponding to the cDAI of the missed DL DCI. The UE may determine whether a DL DCI is missed by determining whether cDAI values are consecutive (for example, cDAI values of 0, then 1, then 3 may indicate that a DCI with a cDAI value of 2 was missed) or by comparing tDAIs and cDAIs of all DCIs in a given PDCCH monitoring occasion (for example, if the tDAI is incremented to 3 but no cDAI of 3 has been received). The UE may generate HARQ feedback based at least in part on the codebook, and may provide the HARQ feedback to a base station. Thus, a UE may identify DCI that has been missed and may generate HARQ feedback based at least in part on cDAIs and tDAIs.

In some aspects, a control channel (e.g., a PDCCH) may be associated with PDCCH repetition. PDCCH repetition (sometimes referred to as a control channel repetition scheme) provides a way to repeat control information in order to improve the likelihood of successful reception of the control information. Each repetition of the control information may be transmitted in a PDCCH candidate. Two or more PDCCH candidates may be used to transmit a same DCI. In a first option, referred to herein as true repetition and PDCCH Repetition Option A, the same coded bits are repeated for each repetition of the PDCCH. Each repetition may have the same number of control channel elements and coded bits, and may include the same DCI payload. In a second option, referred to herein as Option B, two different DCIs are transmitted in two PDCCH candidates, where the payload of the DCIs may be different but may result in the same scheduling decision. For example, the two different DCIs may each schedule the same PDSCH based at least in part on respective slot offsets of the two different DCIs.

In some aspects (referred to herein as Case 1), the two or more PDCCH candidates may be explicitly linked. For example, a UE may receive information (e.g., via radio resource control (RRC) signaling, medium access control (MAC) signaling, DCI, or the like) indicating that the two or more PDCCH candidates are associated with PDCCH repetitions and/or are associated with each other. In other aspects (referred to herein as Case 2), the two or more PDCCH candidates are not explicitly linked. Thus, the UE may not know that the two or more PDCCH candidates are associated with PDCCH repetitions and/or are associated with each other. While the PDCCH repetition implementations described herein are primarily described with regard to a pair of PDCCH repetitions (e.g., a first PDCCH candidate and a second PDCCH candidate), the implementations described herein can be applied for any number of PDCCH repetitions.

There are various outcomes of decoding DCI associated with a pair of PDCCH repetitions. For example, the UE may only decode the DCI in the first PDCCH candidate. As another example, the UE may only decode the DCI in the second PDCCH candidate. As yet another example, the UE may successfully decode the DCI in both PDCCH candidates. For example, the UE may successfully decode the DCI in both PDCCH candidates based at least in part on soft combining (for Option A and Case 1) or may decode the DCI in both PDCCH candidates separately. The network (e.g., a base station that transmits the DCI) may not know which of these outcomes has occurred without receiving feedback from the UE.

Figure 3:
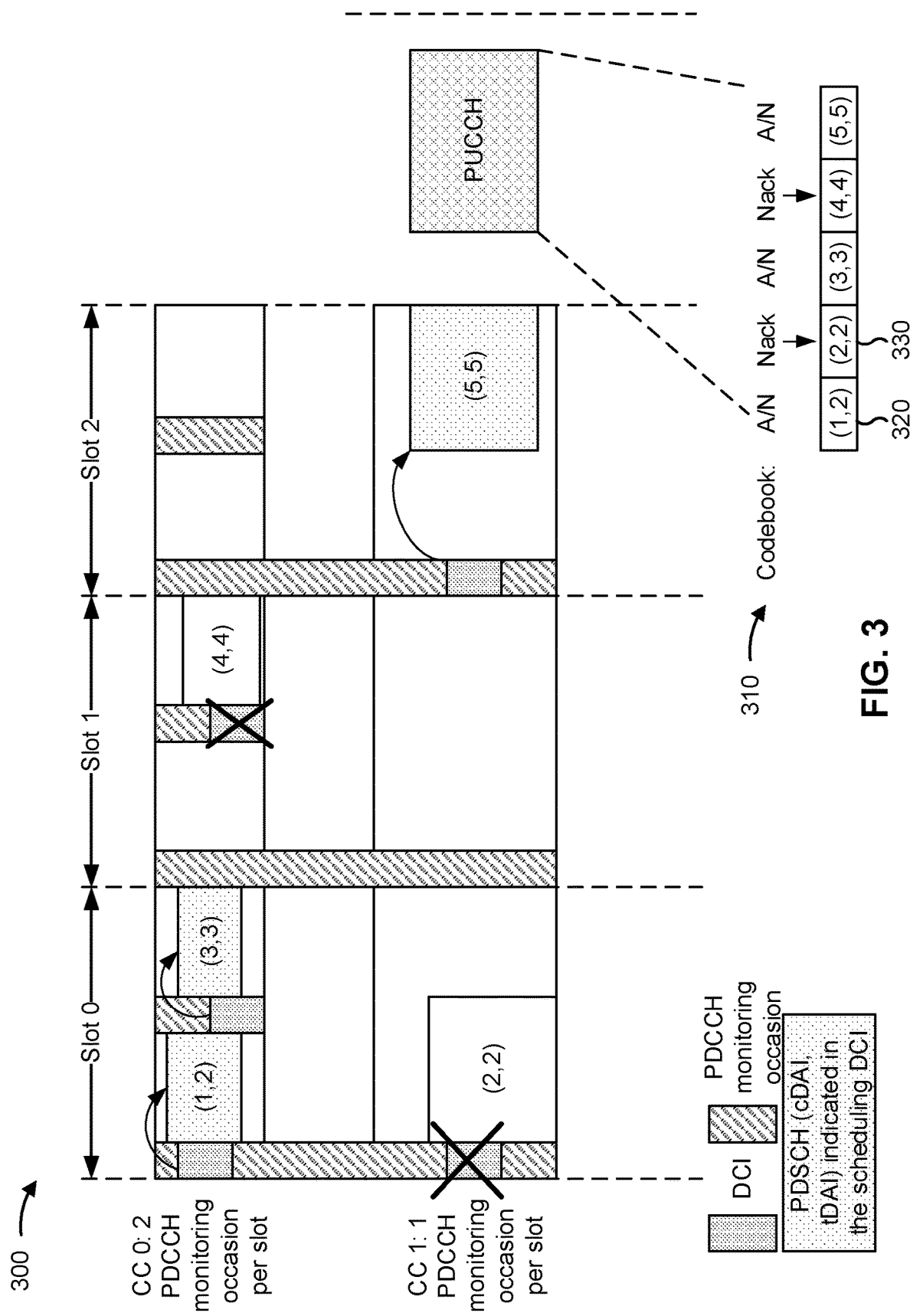
FIG. 3 is a diagram illustrating an example of downlink control information (DCI) and hybrid automatic repeat request acknowledgment (HARQ-Ack) feedback for the DCI, in accordance with the present disclosure.

FIG. 3 is a diagram illustrating an example 300 of DCI and HARQ-Ack feedback for the DCI, in accordance with the present disclosure. In example 300, the horizontal axis represents time and the vertical axis represents frequency. Generally, the blocks in FIG. 3 represent transmissions by a BS. Two cells are shown: a first cell associated with component carrier (CC) 0, and a second cell associated with CC 1. As shown, CC 0 is configured with two PDCCH monitoring occasions per slot and CC 1 is configured with one PDCCH monitoring occasion per slot. Each PDCCH monitoring occasion may include one or more search space sets. Where search space sets are aligned in time, such as at the start of slots 0, 1, and 2, the search space sets may be considered part of a single PDCCH monitoring occasion.

An arrow from DCI to a PDSCH indicates that the DCI successfully schedules the PDSCH. An "X" over a DCI indicates that the UE fails to decode the DCI. If the UE fails to decode the DCI, then the UE may miss the corresponding PDSCH. Here, the UE fails to decode a DCI in slot 0 on CC 1 and a DCI in slot 1 on CC 0. Therefore, the UE may fail to receive the corresponding PDSCHs in slot 0 on CC 1 and slot 1 on CC 0.

As shown, each PDSCH is associated with respective DAIs. For example, the corresponding DCI may indicate a cDAI and a tDAI for the scheduled PDSCH. cDAIs may be counted by serving cell first and PDCCH monitoring occasion second. For example, referring to slot 0, the cDAI is initialized at 1 on CC 0 and is incremented from 1 to 2 in slot 0 on CC 1, as shown in FIG. 3. For illustration, if the cDAI were counted by PDCCH monitoring occasion first and serving cell second, then the cDAI might be incremented across all slots of CC 0 (e.g., with cDAIs of 1 and 2 in slot 0, and 3 in slot 1), then across all slots of CC 1 (e.g., with cDAIs of 4 in slot 0 and 5 in slot 2), as shown in FIG. 3. It should be noted that cDAIs and tDAIs may be indicated using any format, such as a set of bits (e.g., a pair of bits) or the like.

The tDAIs may be included in the case of carrier aggregation, such as shown in example 300. "Carrier aggregation" refers to multiple component carriers (CCs) or serving cells being configured to the UE for communication. In the case of downlink carrier aggregation, the feedback (HARQ-Ack) for data channels scheduled in all the downlink serving cells may be transmitted in a single PUCCH in one uplink serving cell. The tDAIs may indicate a total number of {serving cell, PDCCH monitoring occasion} pairs in which DCI have been transmitted, up to the current PDCCH monitoring occasion. As shown, the same tDAI value may be used in all DCIs in a given PDCCH monitoring occasion. The tDAI may provide protection against missing the DCI corresponding to the last serving cell in the same monitoring occasion.

Reference number 310 shows a feedback codebook, which may be transmitted on an uplink control channel (e.g., a physical uplink control channel (PUCCH)) or an uplink shared channel. The feedback codebook may include a set of positions corresponding to cDAI values. For example, a first position 320 may correspond to cDAI value 1 (e.g., indicated by the DCI in the first PDCCH monitoring occasion of slot 0 on CC 0). Thus, in the first position 320, the UE inserts a bit indicating an ACK/NACK (A/N) for the PDSCH scheduled by the DCI indicating the cDAI value 1. An ACK in the first position 320 indicates that the UE successfully decoded the PDSCH associated with DAI values of (1, 2), whereas a NACK in the first position 320 indicates that the UE failed to decode the PDSCH.

A second position 330 may correspond to cDAI value 2 (e.g., indicated by the DCI in the first PDCCH monitoring occasion of slot 0 on CC 1). As shown, the UE fails to receive this DCI. Therefore, the UE inserts a NACK in the feedback codebook at the second position 330. Thus, it can be seen that the NACK can indicate either that the UE failed to decode the DCI or the PDSCH scheduled by the DCI.

As indicated above, FIG. 3 is provided as an example. Other examples may differ from what is described with regard to FIG. 3.

Figure 4:
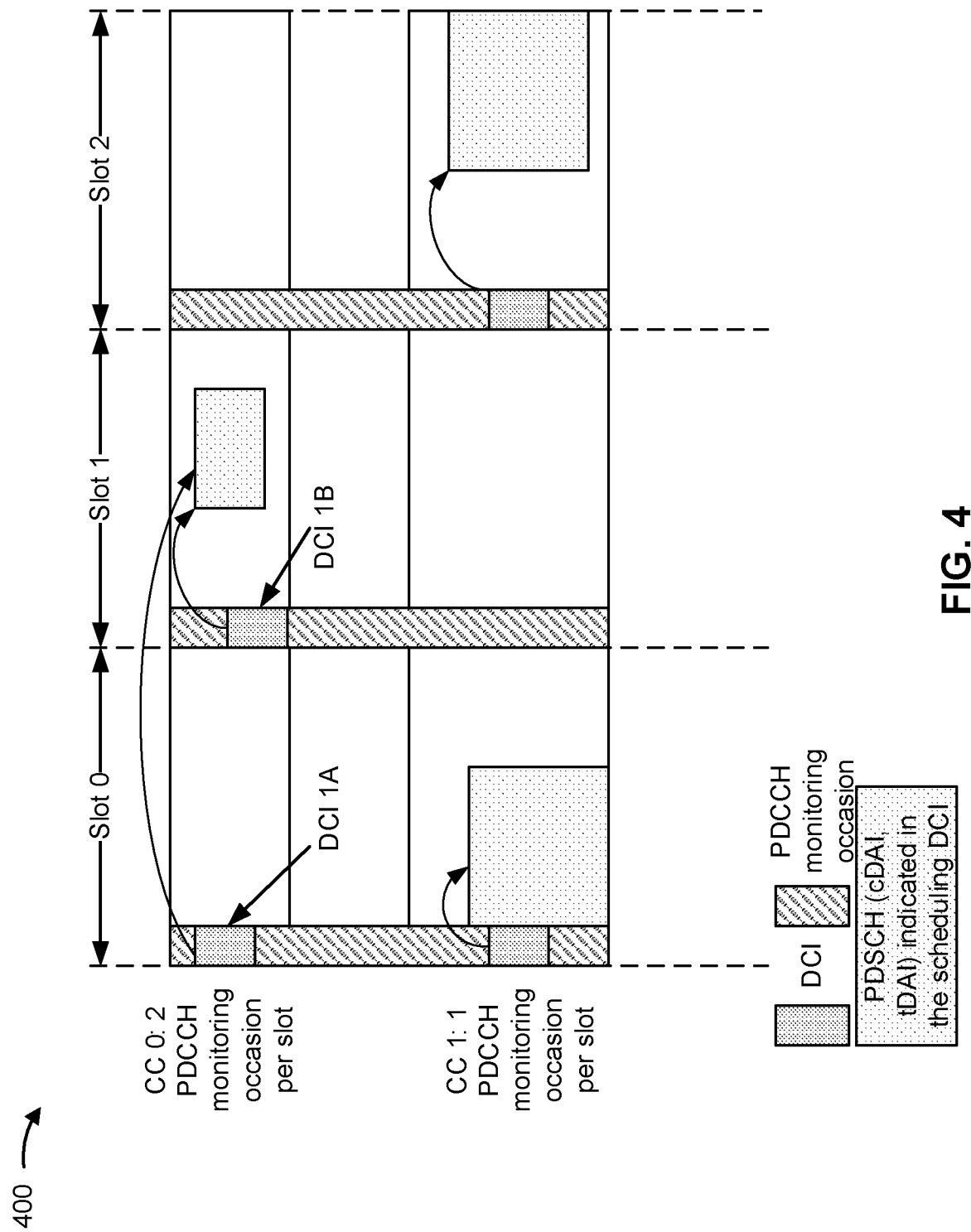
FIG. 4 is a diagram illustrating an example of DCI associated with physical downlink control channel (PDCCH) repetition, in accordance with the present disclosure.

FIG. 4 is a diagram illustrating an example 400 of DCI associated with PDCCH repetition, in accordance with the present disclosure. In example 400, the horizontal axis represents time and the vertical axis represents frequency. Generally, the blocks in FIG. 4 represent transmissions by a BS. Two cells are shown: a first cell associated with CC 0, and a second cell associated with CC 1. As shown, CC 0 and CC 1 are configured with one PDCCH monitoring occasion per slot. Each PDCCH monitoring occasion may include one or more search space sets. Where search space sets are aligned in time, such as at the start of slots 0, 1, and 2, the search space sets may be considered part of a single PDCCH monitoring occasion.

In example 400, DCI 1A and DCI 1B are associated with PDCCH repetition. Thus, DCI 1A and DCI 1B may both schedule the PDSCH indicated by the arrows from DCI 1A and DCI 1B. For example, DCI 1A and DCI 1B may be transmitted on PDCCH candidates associated with PDCCH repetitions. In some aspects (e.g., Option A described above), DCI 1A and DCI 1B have a same DCI payload (e.g., true repetition). In some aspects, (e.g., Option B described above), DCI 1A and DCI 1B are have different DCI payloads that both schedule the same PDSCH. It should be noted that DCI 1A and DCI 1B may be referred to herein as a first DCI and a second DCI, and that this method of referring to DCI 1A and DCI 1B can include true repetitions of DCI or separate DCI.

If each DCI schedules a different PDSCH, then HARQ-Ack feedback for the DCI may be straightforward, as described with regard to FIG. 3. However, in example 400, two DCI messages schedule the same PDSCH. Thus, there are three PDSCHs and four DCI. Therefore, there may be ambiguity as to how to arrange the feedback codebook (which is generally based at least in part on cDAI values indicated by each DCI) when multiple DCI messages are associated with a single PDSCH. Furthermore, in some implementations, DCI 1A and DCI 1B are true repetitions of each other (and therefore have the same DAI values), whereas in other implementations, DCI 1A and DCI 1B are separate DCI with separate DAI values. Still further, in some implementations, DCI 1A and DCI 1B may be linked (e.g., Case 1); whereas, in other implementations, DCI 1A and DCI 1B may not be linked (e.g., Case 2). These ambiguities can lead to misinterpreted HARQ-Ack feedback, which may consume communication resources of the UE or the base station in retransmitting, or failing to retransmit, communications between the UE and the base station.

Some techniques and apparatuses described herein provide techniques for determining and transmitting HARQ-Ack feedback (e.g., a feedback codebook, such as a HARQ-Ack codebook) for a set of DCI messages associated with PDCCH repetition. In some aspects, the UE determines the HARQ-Ack codebook based at least in part on the assumption that if both PDCCH candidates that are linked together, the same cDAI and tDAI values are indicated corresponding to the scheduled PDSCH. For example, the HARQ-Ack codebook may include a single position corresponding to the scheduled PDSCH. In other aspects, the UE determines the HARQ-Ack codebook based at least in part on the assumption that two positions in the HARQ-Ack codebook can correspond to the same scheduled PDSCH. For example, the HARQ-Ack codebook may include a first position corresponding to the first DCI (e.g., on a first control channel candidate) and a second position corresponding to a second DCI (e.g., on a second control channel candidate), where the first control channel candidate and the second control channel candidate are associated with a control channel repetition scheme. In this way, the UE can indicate results of decoding at least one of a plurality of DCI that schedule a PDSCH, and/or the PDSCH itself, via a HARQ-Ack codebook, which improves utilization of communication resources and efficiency of downlink communications.

As indicated above, FIG. 4 is provided as an example. Other examples may differ from what is described with regard to FIG. 4.

Figure 5:
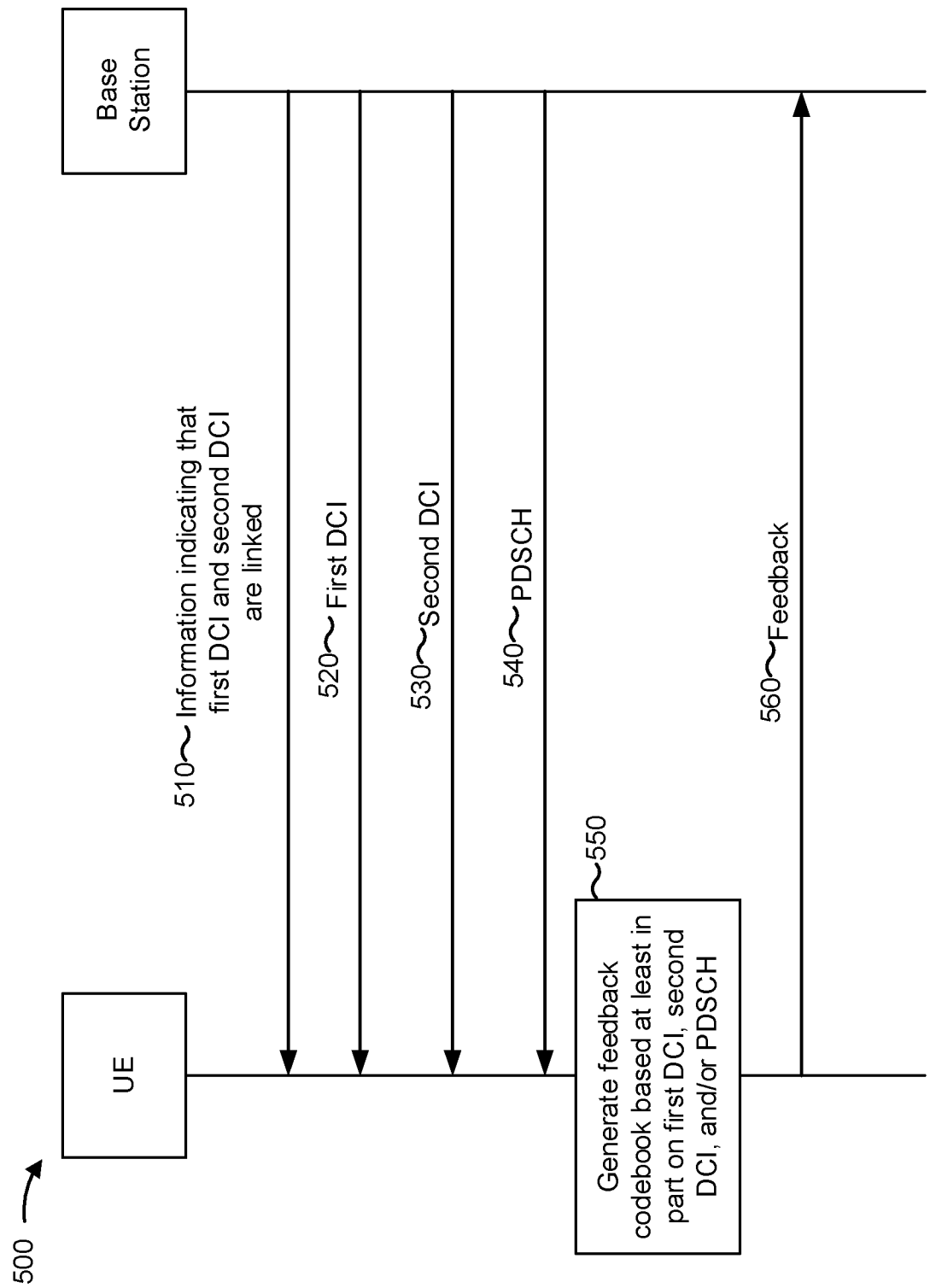
FIG. 5 is a diagram illustrating an example of determining and transmitting a feedback codebook for a set of DCIs associated with a control channel repetition scheme, in accordance with the present disclosure.

FIG. 5 is a diagram illustrating an example 500 of determining and transmitting a feedback codebook for a set of DCIs associated with a control channel repetition scheme, in accordance with the present disclosure. As shown, example 500 includes a UE (e.g., UE 120) and a BS (e.g., BS 110). Example 500 relates to a feedback codebook including a single position corresponding to a data channel scheduled by first DCI and second DCI associated with a control channel repetition scheme.

As shown by reference number 510, the UE 120 may receive information indicating that the first DCI and the second DCI are linked. For example, the information indicating that the first DCI and the second DCI are linked may include RRC signaling, MAC signaling, DCI, or the like. In some aspects, the UE may determine that the first DCI and the second DCI are linked (e.g., without receiving the information, or based at least in part on receiving the information). In some aspects, the information may indicate that PDCCH candidates associated with the first DCI and the second DCI are linked. In some aspects, the information indicating that the first DCI and the second DCI are linked may include information associated with configuring the control channel repetition scheme.

As shown by reference numbers 520 and 530, the UE may receive first DCI and second DCI from the BS. The first DCI and the second DCI may each schedule a PDSCH. For example, the first DCI and the second DCI may include scheduling information that indicates a resource allocation associated with the PDSCH. As mentioned above, the first DCI and the second DCI are associated with a control channel repetition scheme (e.g., PDCCH repetition). For example, the first DCI and the second DCI may be true repetitions (e.g., Option A) and may be associated with the same DAI values. As another example, the first DCI and the second DCI may be different from each other (e.g., Option B) and may be associated with respective DAI values. Since the first DCI and the second DCI are linked, if the UE decodes either of the first DCI or the second DCI in at least one of the two linked PDCCH candidates, the UE can determine a resource associated with the PDSCH.

As shown by reference number 540, the BS may transmit the PDSCH. If the UE successfully decodes either of the first DCI or the second DCI, then the UE may attempt to decode the PDSCH in a resource allocation indicated by the first DCI or the second DCI. If the UE fails to decode both the first DCI and the second DCI, then the UE may fail to decode the PDSCH, since the UE may not be aware of the transmission of the PDSCH.

As shown by reference number 550, the UE may generate a feedback codebook based at least in part on the first DCI, the second DCI, and/or the PDSCH. The feedback codebook may indicate a result of decoding at least one of the first DCI, the second DCI, or the PDSCH scheduled by the first DCI and the second DCI.

In example 500, the feedback codebook may include a single position corresponding to a cDAI value of the PDSCH. Thus, if the UE decodes the DCI in at least one of the two linked PDCCH candidates, then the UE may generate an A/N bit corresponding to the scheduled PDSCH in the corresponding position in the feedback codebook. If the UE does not decode either of the first DCI and the second DCI, the UE may generate a NACK corresponding to the missed DCI in the feedback codebook. In some aspects, if the two DCIs are different DCIs (e.g., in accordance with Option B) and have different DAI values, and the UE successfully decodes both DCIs, then the UE may ignore one of the two DCIs for the purpose of generating the feedback codebook. For example, the UE may ignore a first DCI, and may determine the A/N bit based at least in part on a second DCI. As another example, the UE may ignore a second DCI, and may determine the A/N bit based at least in part on a first DCI. In some aspects, if the two DCIs are different DCIs (e.g., in accordance with Option B) and have different DAI values, and the UE successfully decodes both DCIs, then the UE may treat this as an error case (e.g., may ignore both DCIs and may not receive the scheduled PDSCH).

In some aspects, the single position in the feedback codebook may be based at least in part on a cDAI value or a tDAI value. For example, since cDAI and tDAI are defined with regard to a number of {serving cell, PDCCH monitoring occasion} pairs, the UE may use an assumption when the PDCCH monitoring occasions of the first DCI and the second DCI are not the same (as in example 500) to determine which PDCCH monitoring occasion to use to determine the single position. In some aspects, the UE may use an earlier PDCCH monitoring occasion, of the first PDCCH monitoring occasion and the second PDCCH monitoring occasion, to determine the single position. For example, among the two PDCCH monitoring occasions, the earlier PDCCH monitoring occasion may be assumed as a reference PDCCH monitoring occasion for both PDCCH candidates for the purpose of interpreting the cDAI/tDAI value indicated in the DCI. In some aspects, the UE may use a later PDCCH monitoring occasion, of the first PDCCH monitoring occasion and the second PDCCH monitoring occasion, to determine the single position. For example, among the two PDCCH monitoring occasions, the later PDCCH monitoring occasion may be assumed as a reference PDCCH monitoring occasion for both PDCCH candidates for the purpose of interpreting the cDAI/tDAI value indicated in the DCI. For a more detailed description of the feedback codebook described with regard to FIG. 5, refer to the description accompanying FIG. 6.

As shown by reference number 560, the UE may transmit the feedback codebook. For example, the UE may transmit the feedback codebook on a PUCCH. In some aspects, the base station may perform an action based at least in part on the feedback codebook. For example, the base station may retransmit a DCI and/or a PDSCH based at least in part on whether the single position indicates an ACK or a NACK.

Figure 6:
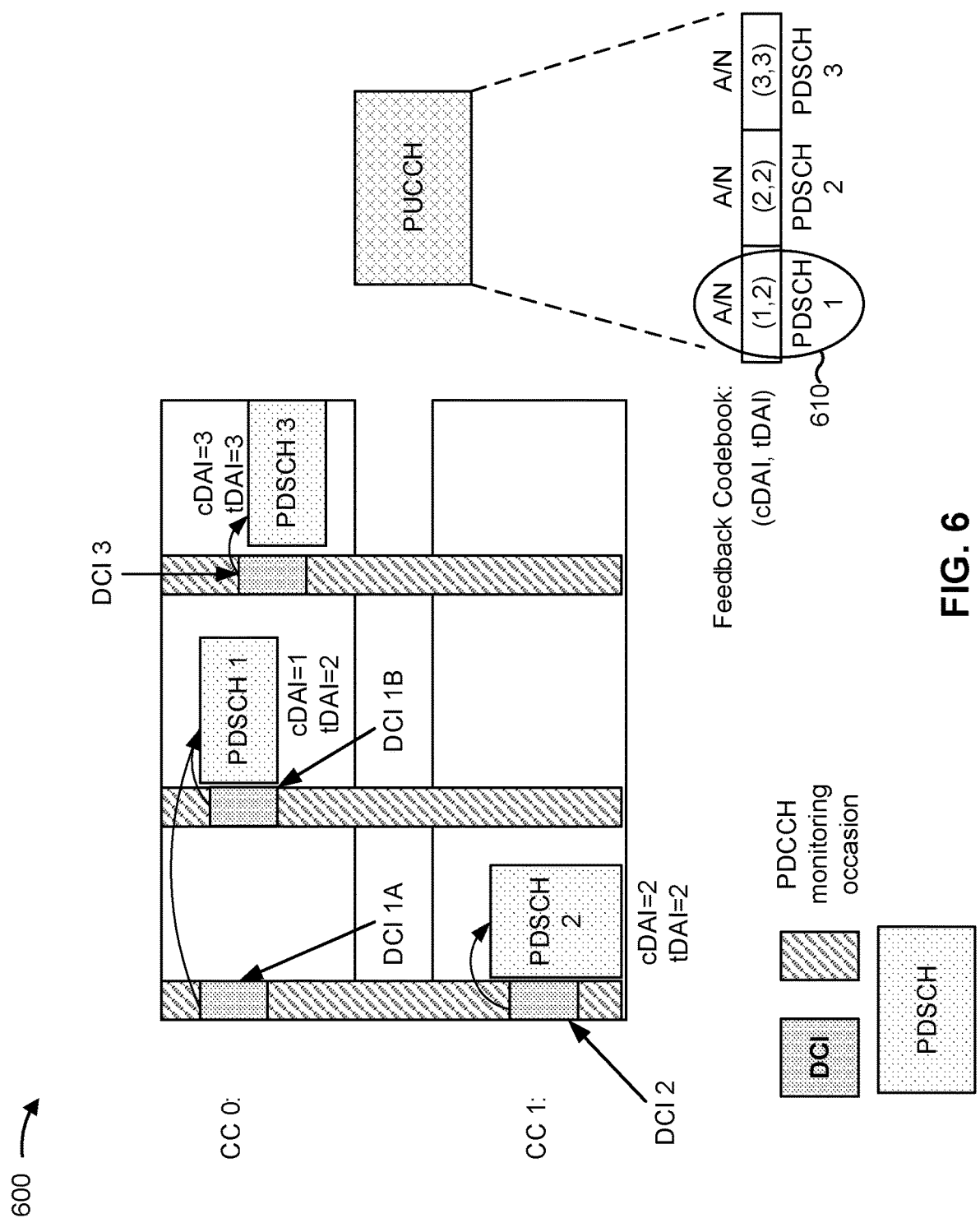
FIG. 6 is a diagram illustrating an example of a feedback codebook associated with a control channel repetition scheme, in accordance with the present disclosure.

FIG. 6 is a diagram illustrating an example 600 of a feedback codebook associated with a control channel repetition scheme, in accordance with the present disclosure. As shown, FIG. 6 includes a DCI 1A and a DCI 1B, which schedule a PDSCH 1. Furthermore, FIG. 6 includes a DCI 2, which schedules a PDSCH 2, and a DCI 3, which schedules a PDSCH 3. Example 600 is an example where the UE uses an earlier PDCCH monitoring occasion, of the first PDCCH monitoring occasion and the second PDCCH monitoring occasion, to determine the position in the feedback codebook for the A/N bit corresponding to PDSCH 1. For example, among the two PDCCH monitoring occasions, the earlier PDCCH monitoring occasion may be assumed as a reference PDCCH monitoring occasion for both PDCCH candidates for the purpose of interpreting the cDAI/tDAI value indicated in the DCI.

The feedback codebook position associated with the PDSCH 1 is shown by reference number 610. As shown, the UE may insert an A/N bit at a position in the feedback codebook. In example 600, the UE inserts the A/N bit at a position corresponding to DAI (1, 2). For example, the UE may use a DAI associated with an earlier PDCCH monitoring occasion (e.g., corresponding to DCI 1A) to determine the feedback codebook. Here, the earlier PDCCH monitoring occasion is associated with a DAI of (1, 2) based at least in part on the earlier PDCCH monitoring including DCI 1A. In some aspects, the UE 120 may ignore the later PDCCH monitoring occasion for the purpose of generating the feedback codebook. It can be seen that the DAIs of the feedback codebook do not take into account DCI 1B.

Figure 7:
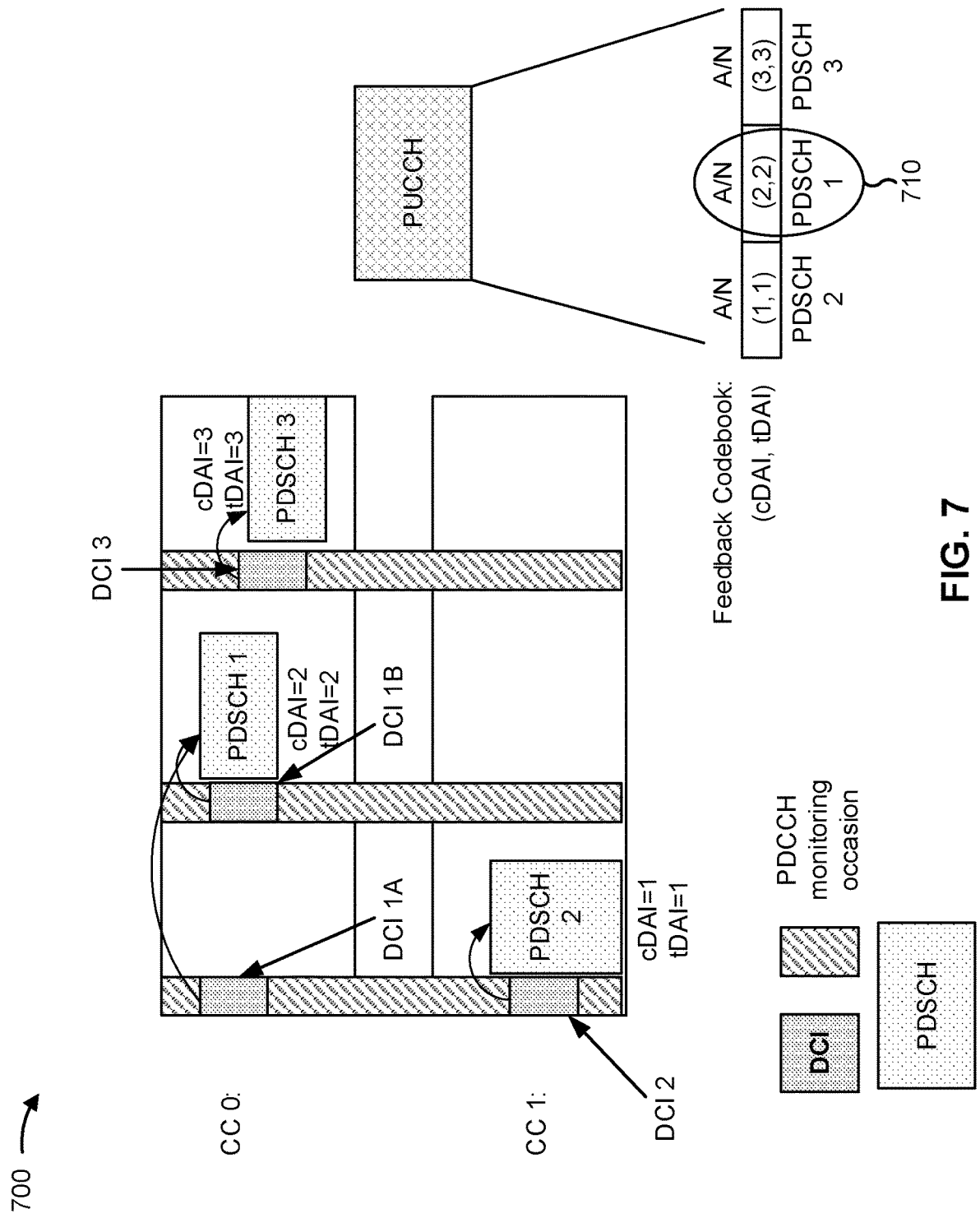
FIG. 7 is a diagram illustrating another example of a feedback codebook associated with a control channel repetition scheme, in accordance with the present disclosure.

FIG. 7 is a diagram illustrating another example of a feedback (e.g., HARQ-Ack) codebook associated with a control channel repetition scheme, in accordance with the present disclosure. As shown, FIG. 7 includes a DCI 1A and a DCI 1B, which schedule a PDSCH 1. Furthermore, FIG.

7 includes a DCI 2, which schedules a PDSCH 2, and a DCI 3, which schedules a PDSCH 3. Example 700 is an example where the UE uses a later PDCCH monitoring occasion, of the first PDCCH monitoring occasion and the second PDCCH monitoring occasion, to determine the position in the feedback codebook for the A/N bit corresponding to PDSCH 1. For example, among the two PDCCH monitoring occasions, the later PDCCH monitoring occasion may be assumed as a reference PDCCH monitoring occasion for both PDCCH candidates for the purpose of interpreting the cDAI/tDAI value indicated in the DCI.

The feedback codebook position associated with the PDSCH 1 is shown by reference number 710. As shown, the UE may insert an A/N bit at a position in the feedback codebook. In example 700, the UE inserts the A/N bit at a position corresponding to DAI (2, 2). For example, the UE may use a DAI associated with a later PDCCH monitoring occasion (e.g., corresponding to DCI 1B) to determine the feedback codebook. Here, the later PDCCH monitoring occasion is associated with a DAI of (2, 2) based at least in part on the earlier PDCCH monitoring that includes DCI 1A being disregarded. For example, the UE may ignore the earlier PDCCH monitoring occasion for the purpose of generating the feedback codebook. It can be seen that the DAIs of the feedback codebook do not take into account DCI 1A.

As indicated above, FIGS. 5-7 are provided as one or more examples. Other examples may differ from what is described with regard to FIGS. 5-7.

Figure 8:
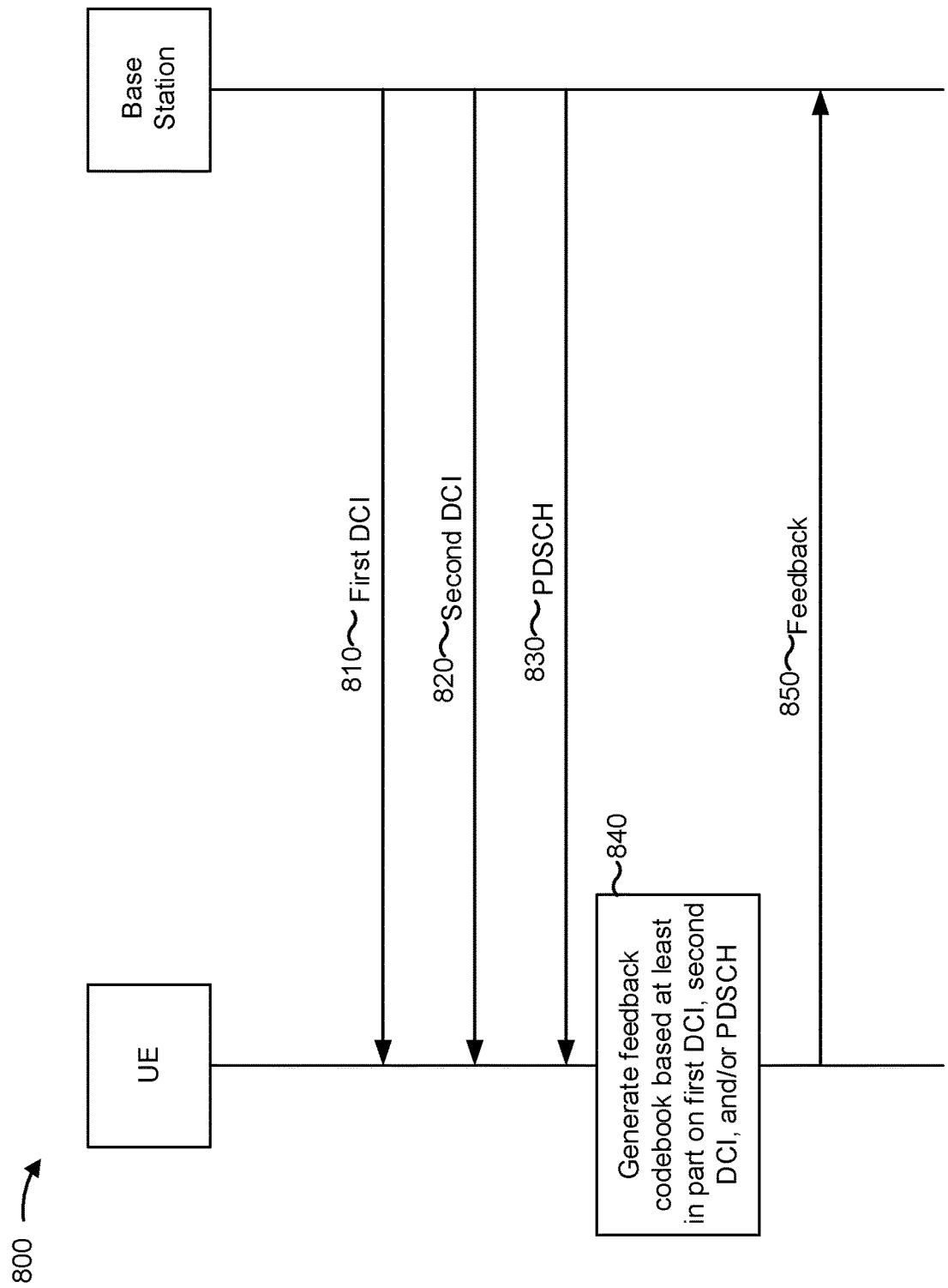
FIG. 8 is a diagram illustrating an example of determining and transmitting a feedback codebook for a set of DCIs associated with a control channel repetition scheme, in accordance with the present disclosure.

FIG. 8 is a diagram illustrating an example 800 of determining and transmitting a feedback codebook for a set of DCIs associated with a control channel repetition scheme, in accordance with the present disclosure. As shown, example 800 includes a UE (e.g., UE 120) and a BS (e.g., BS 110). Example 800 relates to a feedback codebook including a first position corresponding to first DCI on a first control channel candidate and a second position corresponding to second DCI on a second control channel candidate, wherein the first control channel candidate and the second control channel candidate are associated with a control channel repetition scheme.

As shown by reference numbers 810 and 820, the UE may receive first DCI and second DCI from the BS. The first DCI and the second DCI may each schedule a PDSCH. For example, the first DCI and thee second DCI may include scheduling information that indicates a resource allocation associated with the PDSCH. As mentioned above, the first DCI and the second DCI are associated with a control channel repetition scheme (e.g., PDCCH repetition). For example, the first DCI and the second DCI may be different from each other (e.g., Option B) and may be associated with respective DAI values. Thus, the first DCI and the second DCI can include different cDAI/tDAI values even though the first DCI and the second DCI schedule the same PDSCH.

As shown by reference number 830, the BS may transmit the PDSCH. If the UE successfully decoded at least one of the first DCI or the second DCI, then the UE may attempt to decode the PDSCH in a resource allocation indicated by the first DCI or the second DCI. If the UE failed to decode both the first DCI and the second DCI, then the UE may fail to decode the PDSCH, since the UE may not be aware of the transmission of the PDSCH. In this case, the single position in the feedback codebook may be determined based at least in part on cDAI and/or tDAI of one or more other DCIs (other than the first DCI and the second DCI) that are decoded successfully.

As shown by reference number 840, the UE may generate a feedback codebook based at least in part on the first DCI, the second DCI, and/or the PDSCH. The feedback codebook may indicate a result of decoding at least one of the first DCI, the second DCI, or the PDSCH scheduled by the first DCI and the second DCI.

In example 800, the feedback codebook includes a first position corresponding to the first DCI and a second position corresponding to the second DCI. For example, the first position may be based at least in part on a DAI of the first DCI, and the second position may be based at least in part on a DAI of the second DCI. If the UE detects both DCIs (e.g., the first DCI and the second DCI) in the two PDCCH candidates, and both DCIs schedule the same PDSCH, the UE may generate two A/N bits corresponding to the two positions in the feedback codebook determined by the cDAI/tDAI values of both DCIs. In some aspects, the decoding result of the scheduled PDSCH is considered for both positions in the feedback codebook (e.g., the feedback codebook may indicate the decoding result of the PDSCH in the first position and the second position). In other aspects, only one of the positions in the feedback codebook is considered for an A/N for the decoding result of the scheduled PDSCH (e.g., the first position or the second position). For the other position, a NACK may be inserted in the feedback codebook. If the UE detects one of the two DCIs (e.g., the first DCI or the second DCI) in one of the PDCCH candidates, and the other DCI is missed, the feedback codebook construction may be performed as described in connection with FIG. 3. If a hole in the DAI is detected based at least in part on the DAI of the next DCI, the UE may insert a NACK in the feedback codebook. For example, the UE may detect a hole in a DAI based at least in part on identifying cDAIs of 1, 2, and 4 (in this example, DCI associated with a cDAI of 3 was missed and the absence of the DCI associated with the cDAI of 3 is referred to as the hole). In this case, in some aspects, the definition of cDAI and tDAI may be unchanged relative to the definition described elsewhere herein. For example, the cDAI and tDAI may be determined as if the two DCIS schedule different PDSCHs. For a more detailed description of determining the feedback codebook, refer to the description accompanying FIGS. 9 and 10.

As shown by reference number 850, the UE may transmit the feedback codebook. For example, the UE may transmit the feedback codebook on a PUCCH. In some aspects, the base station may perform an action based at least in part on the feedback codebook. For example, the base station may retransmit a DCI and/or a PDSCH based at least in part on whether the single position indicates an ACK or a NACK.

Figure 9:
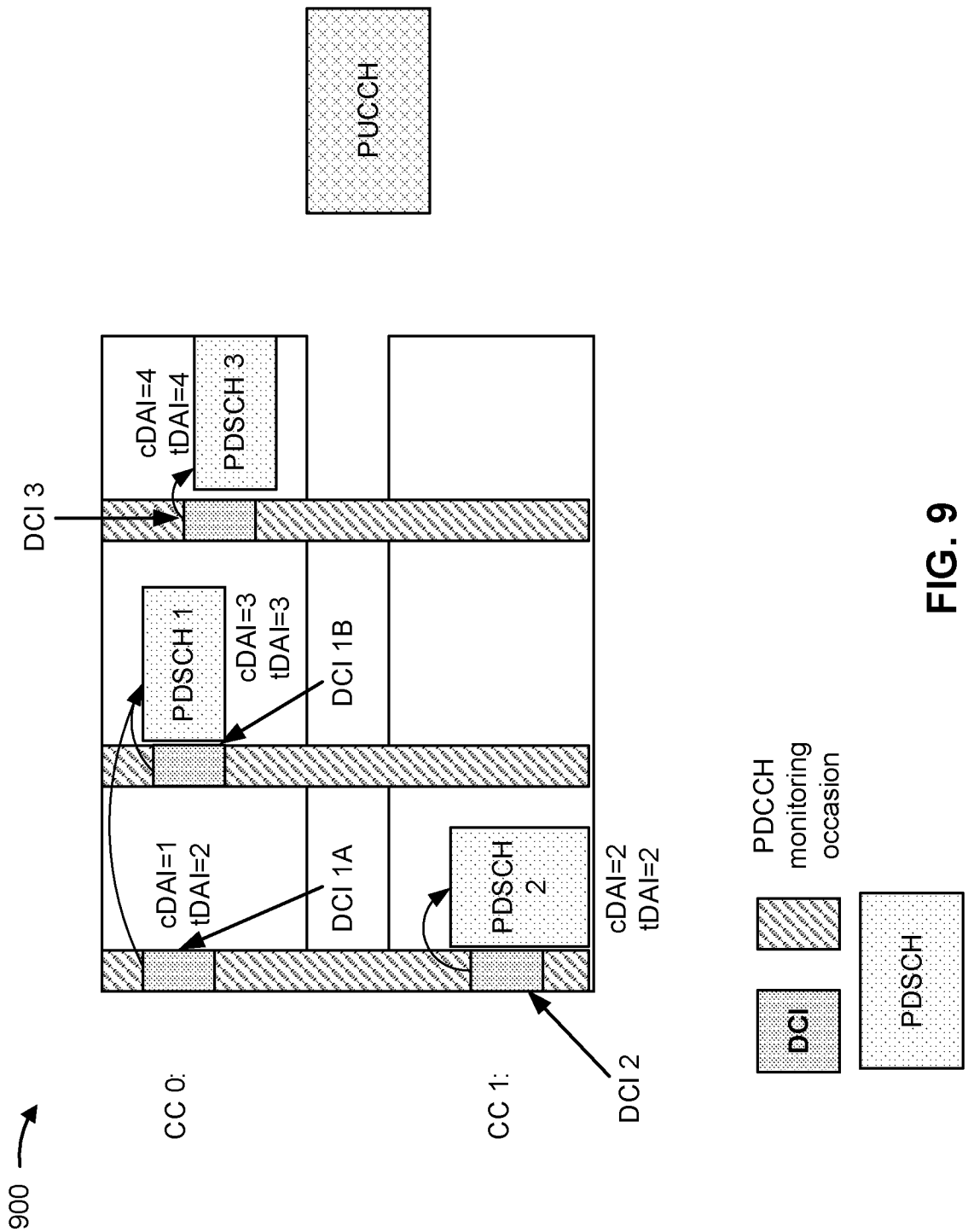
FIG. 9 is a diagram illustrating an example of a feedback codebook associated with a control channel repetition scheme, in accordance with the present disclosure.
Figure 10:
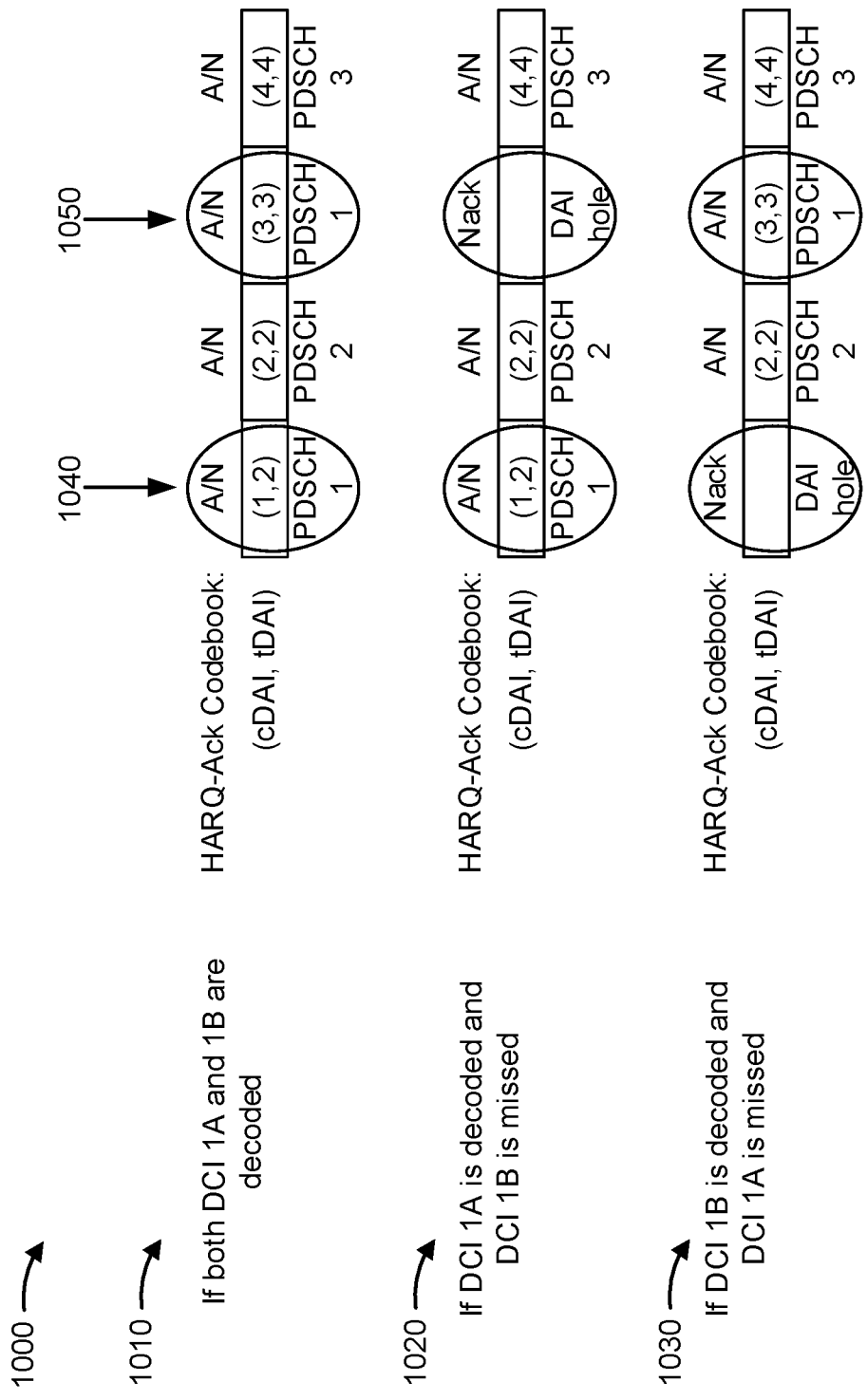
FIG. 10 is a diagram illustrating an example of values of the feedback codebook described with regard to FIGS. 8 and 9, in accordance with the present disclosure.

FIG. 9 is a diagram illustrating an example 900 of a feedback codebook associated with a control channel repetition scheme, in accordance with the present disclosure. FIG. 10 is a diagram illustrating an example 1000 of values of the feedback codebook described with regard to FIGS. 8 and 9, in accordance with the present disclosure. As shown, FIG. 9 includes a DCI 1A (with DAI values of (1, 2)) and a DCI 1B (with DAI values of (3, 3)), which schedule a PDSCH 1. Furthermore, FIG. 9 includes a DCI 2 (with DAI values of (2, 2)), which schedules a PDSCH 2, and a DCI 3 (with DAI values of (4, 4)), which schedules a PDSCH 3.

In FIG. 10, three potential outcomes are shown: a first outcome 1010 in which both DCI 1A and DCI 1B are successfully decoded, a second outcome 1020 in which only DCI 1A is successfully decoded, and a third outcome 1030 in which only DCI 1B is decoded. The feedback codebook position associated with DCI 1A (e.g., the first position) is shown by reference number 1040, and the feedback codebook position associated with DCI 1B (e.g., the second position) is shown by reference number 1050. It should be noted that the arrangement of the "first position" and "second position" may be based at least in part on the DAI values of the DCI 1A and the DCI 1B, and may not necessarily be in a first position and a second position relative to other positions of the feedback codebook.

In the first outcome 1010, the feedback codebook may include, at the first position and the second position, A/N bits indicating a result of decoding the PDSCH scheduled by DCI 1A and DCI 1B. In some aspects (not shown), the feedback codebook may include, at one of the first position and the second position, an A/N bit indicating a result of decoding the PDSCH, and the other position may indicate a value (e.g., a default value, or the like).

In the second outcome 1020, the feedback codebook may include, at the first position, an A/N bit indicating a result of decoding the PDSCH scheduled by DCI 1A. Furthermore, the UE may identify a hole (e.g., may identify that DCI 1B is missed) based at least in part on the DAIs of the DCIs 1A, 1B, 2, and 3. Based at least in part on the hole, the UE may insert a NACK at the second position, as shown.

In the third outcome 1030, the feedback codebook may include, at the second position, an A/N bit indicating a result of decoding the PDSCH scheduled by DCI 1B. Furthermore, the UE may identify a hole (e.g., may identify that DCI 1A is missed) based at least in part on the DAIs of the DCIs 1A, 1B, 2, and 3. Based at least in part on the hole, the UE may insert a NACK at the first position, as shown.

As indicated above, FIGS. 8-10 are provided as one or more examples. Other examples may differ from what is described with regard to FIGS. 8-10.

Figure 11:
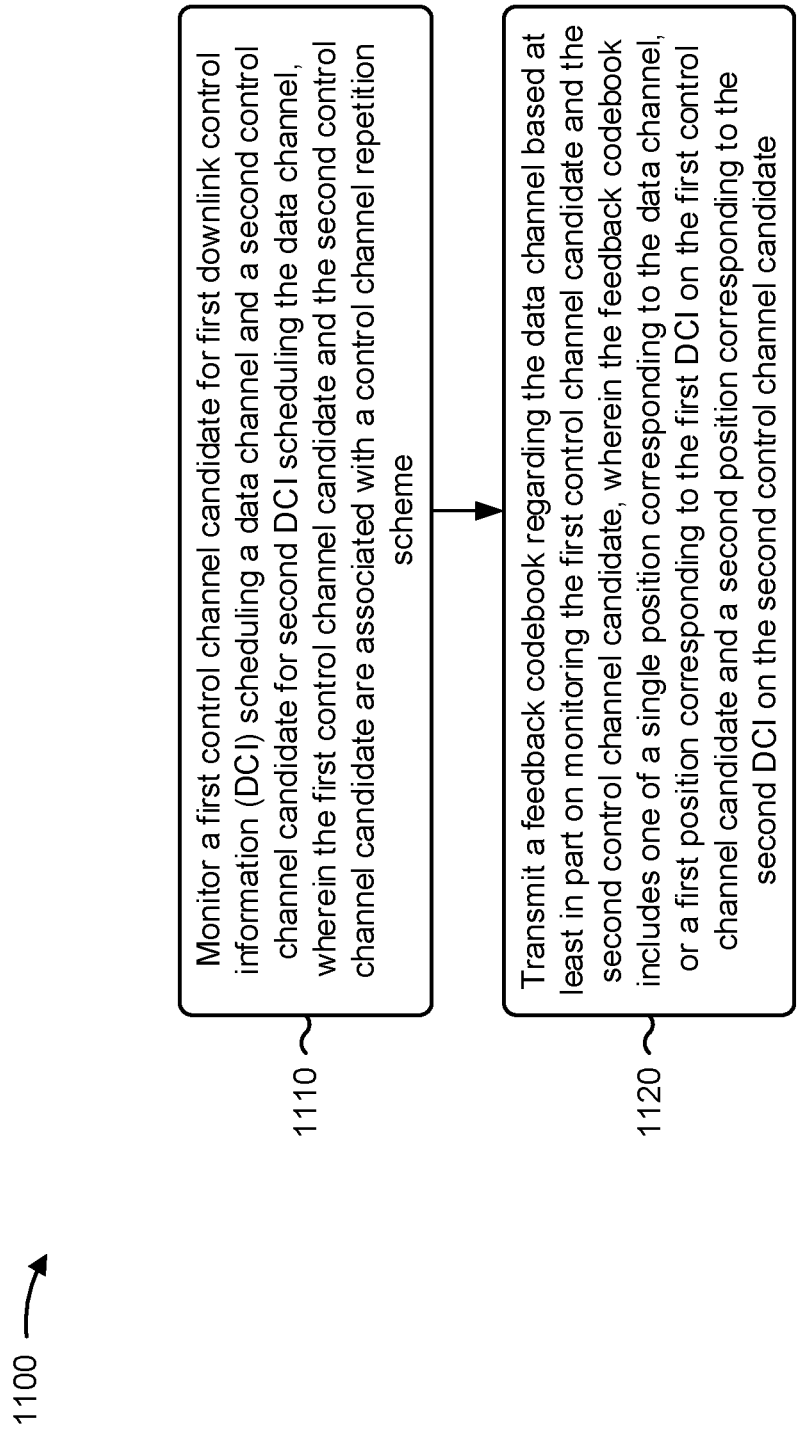
FIGS. 11-12 are diagrams illustrating example processes associated with downlink assignment index (DAI) operation for control channel repetition, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with downlink assignment index operation for control channel repetition.

As shown in FIG. 11, in some aspects, process 1100 may include monitoring a first control channel candidate for first downlink control information (DCI) scheduling a data channel and a second control channel candidate for second DCI scheduling the data channel, wherein the first control channel candidate and the second control channel candidate are associated with a control channel repetition scheme (block 1110). For example, the UE (e.g., using monitoring component 1308, depicted in FIG. 13) may monitor a first control channel candidate for first DCI scheduling a data channel and a second control channel candidate for second DCI scheduling the data channel, wherein the first control channel candidate and the second control channel candidate are associated with a control channel repetition scheme, as described above.

As further shown in FIG. 11, in some aspects, process 1100 may include transmitting a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate (block 1120). For example, the UE (e.g., using transmission component 1304, depicted in FIG. 13) may transmit a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate, as described above. In some aspects, the single position is based at least in part on a reference control channel monitoring occasion for interpreting a downlink assignment index of the first DCI or the second DCI Process 1100 may include additional aspects, such as any single aspect or any combination of aspects described below and/or in connection with one or more other processes described elsewhere herein.

In a first aspect, the first control channel candidate and the second control channel candidate are linked to each other.

In a second aspect, alone or in combination with the first aspect, at least one of the first DCI or the second DCI is successfully decoded, and the single position indicates acknowledgment information for the data channel.

In a third aspect, alone or in combination with one or more of the first and second aspects, the first DCI indicates a different downlink assignment index than the second DCI, and the feedback codebook ignores one of the first DCI or the second DCI based at least in part on the first DCI indicating a different downlink assignment index than the second DCI.

In a fourth aspect, alone or in combination with one or more of the first through third aspects, process 1100 includes determining an error case associated with the first DCI and the second DCI.

In a fifth aspect, alone or in combination with one or more of the first through fourth aspects, the first DCI and the second DCI indicate a same downlink assignment index, and the single position is associated with the same downlink assignment index.

In a sixth aspect, alone or in combination with one or more of the first through fifth aspects, the single position of the feedback codebook uses an earlier control channel monitoring occasion, of a control channel monitoring occasion associated with the first control channel candidate and a control channel monitoring occasion associated with the second control channel candidate, as a reference control channel monitoring occasion for interpreting a downlink assignment index of the first DCI or the second DCI.

In a seventh aspect, alone or in combination with one or more of the first through sixth aspects, the single position of the feedback codebook uses a later control channel monitoring occasion, of a control channel monitoring occasion associated with the first control channel candidate and a control channel monitoring occasion associated with the second control channel candidate, as a reference control channel monitoring occasion for interpreting a downlink assignment index of the first DCI or the second DCI.

In an eighth aspect, alone or in combination with one or more of the first through seventh aspects, the first DCI indicates a first downlink assignment index and the second DCI indicates a second downlink assignment index, wherein the first position is associated with the first downlink assignment index and the second DCI is associated with the second downlink assignment index.

In a ninth aspect, alone or in combination with one or more of the first through eighth aspects, the feedback codebook includes first feedback information at the first position and second feedback information at the second position.

In a tenth aspect, alone or in combination with one or more of the first through ninth aspects, process 1100 includes successfully decoding the first DCI and the second DCI, wherein the first feedback information and the second feedback information indicate a result of decoding the data channel.

In an eleventh aspect, alone or in combination with one or more of the first through tenth aspects, process 1100 includes successfully decoding the first DCI and the second DCI, wherein the first feedback information indicates a result of decoding the data channel and the second feedback information indicates a negative acknowledgment.

In a twelfth aspect, alone or in combination with one or more of the first through eleventh aspects, process 1100 includes successfully decoding only the first DCI and not the second DCI, wherein the first feedback information indicates a result of decoding the data channel and the second feedback information indicates a negative acknowledgment associated with the second DCI.

In a thirteenth aspect, alone or in combination with one or more of the first through twelfth aspects, the second feedback information indicates the negative acknowledgment associated with the second DCI based at least in part on the UE determining that the second DCI was not received based at least in part on a downlink assignment index associated with the second DCI.

In a fourteenth aspect, alone or in combination with one or more of the first through thirteenth aspects, if the UE fails to decode the first DCI and the second DCI, the feedback codebook indicates a negative acknowledgment at the single position.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
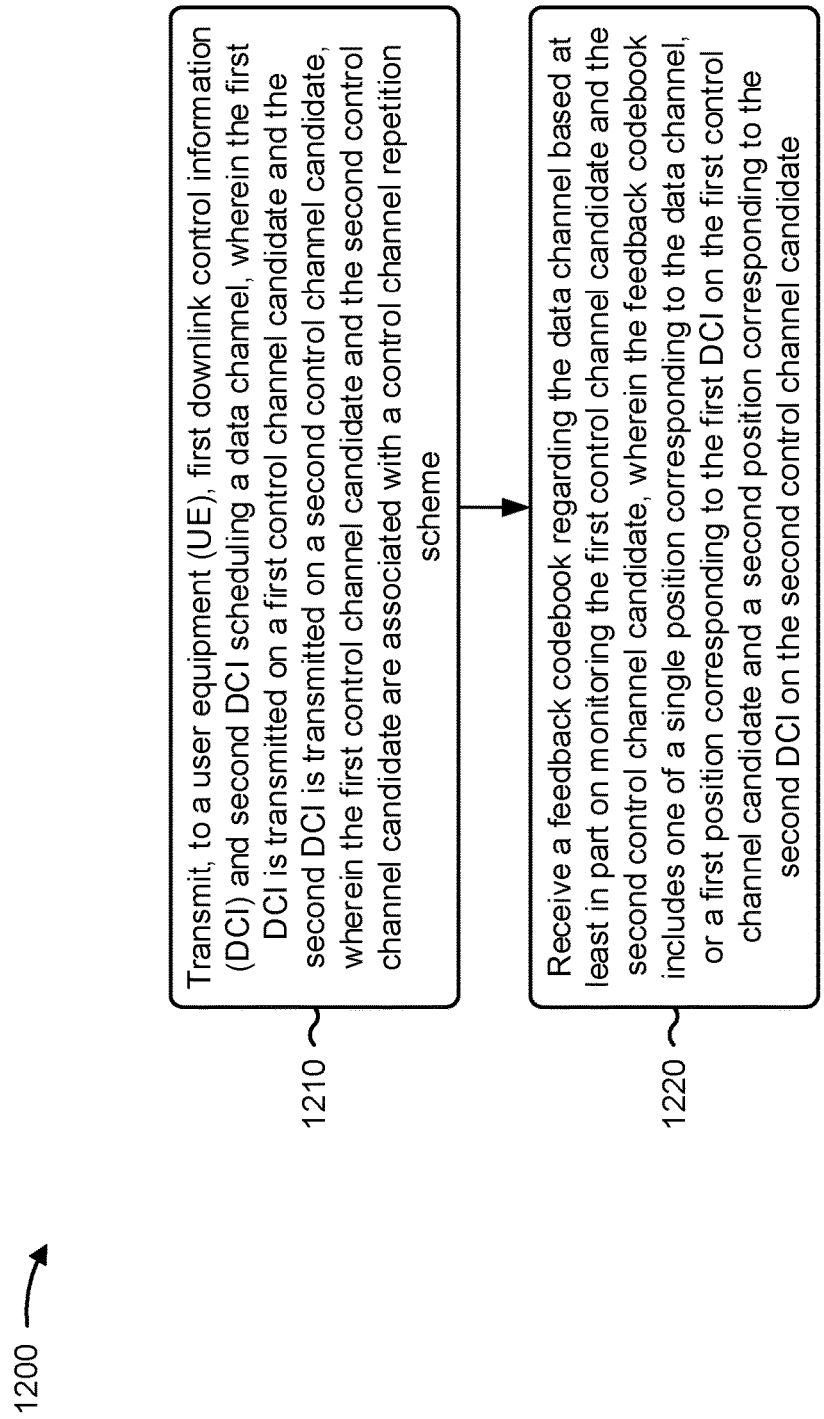

FIG. 12 is a diagram illustrating an example process 1200 performed, for example, by a base station, in accordance with the present disclosure. Example process 1200 is an example where the base station (e.g., base station 110) performs operations associated with downlink assignment index operation for control channel repetition.

As shown in FIG. 12, in some aspects, process 1200 may include transmitting, to a user equipment (UE), first downlink control information (DCI) and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme (block 1210). For example, the base station (e.g., using transmission component 1404, depicted in FIG. 14) may transmit, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme, as described above.

As further shown in FIG. 12, in some aspects, process 1200 may include receiving a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate (block 1220). For example, the base station (e.g., using reception component 1402, depicted in FIG. 14) may receive a feedback codebook regarding the data channel based at least in part on monitoring the first control channel candidate and the second control channel candidate, wherein the feedback codebook includes one of: a single position corresponding to the data channel, or a first position corresponding to the first DCI on the first control channel candidate and a second position corresponding to the second DCI on the second control channel candidate, as described above. In some aspects, the single position is based at least in part on a reference control channel monitoring occasion for interpreting a downlink assignment index of the first DCI or the second DCI Process 1200 may include additional aspects, such as any single aspect or any combination of aspects described below and/or in connection with one or more other processes described elsewhere herein.

In a first aspect, the first control channel candidate and the second control channel candidate are linked to each other.

In a second aspect, alone or in combination with the first aspect, the single position indicates acknowledgment information for the data channel based at least in part on at least one of the first DCI or the second DCI being successfully decoded.

In a third aspect, alone or in combination with one or more of the first and second aspects, the first DCI indicates a different downlink assignment index than the second DCI, and the feedback codebook ignores one of the first DCI or the second DCI based at least in part on the first DCI indicating a different downlink assignment index than the second DCI.

In a fourth aspect, alone or in combination with one or more of the first through third aspects, the first DCI and the second DCI indicate a same downlink assignment index, and the single position is associated with the same downlink assignment index.

In a fifth aspect, alone or in combination with one or more of the first through fourth aspects, the single position of the feedback codebook uses an earlier control channel monitoring occasion, of a control channel monitoring occasion associated with the first control channel candidate and a control channel monitoring occasion associated with the second control channel candidate, as a reference control channel monitoring occasion for interpreting a downlink assignment index of the first DCI or the second DCI.

In a sixth aspect, alone or in combination with one or more of the first through fifth aspects, the single position of the feedback codebook uses a later control channel monitoring occasion, of a control channel monitoring occasion associated with the first control channel candidate and a control channel monitoring occasion associated with the second control channel candidate, as a reference control channel monitoring occasion for interpreting a downlink assignment index of the first DCI or the second DCI.

In a seventh aspect, alone or in combination with one or more of the first through sixth aspects, the first DCI indicates a first downlink assignment index and the second DCI indicates a second downlink assignment index, wherein the first position is associated with the first downlink assignment index and the second DCI is associated with the second downlink assignment index.

In an eighth aspect, alone or in combination with one or more of the first through seventh aspects, the feedback codebook includes first feedback information at the first position and second feedback information at the second position.

In a ninth aspect, alone or in combination with one or more of the first through eighth aspects, the first feedback information and the second feedback information indicate a result of decoding the data channel if the UE successfully decodes the first DCI and the second DCI.

In a tenth aspect, alone or in combination with one or more of the first through ninth aspects, the first feedback information indicates a result of decoding the data channel and the second feedback information indicates a negative acknowledgment if the UE successfully decodes the first DCI and the second DCI.

In an eleventh aspect, alone or in combination with one or more of the first through tenth aspects, the first feedback information indicates a result of decoding the data channel and the second feedback information indicates a negative acknowledgment associated with the second DCI based at least in part on the UE decoding only the first DCI and not the second DCI.

In a twelfth aspect, alone or in combination with one or more of the first through eleventh aspects, the second feedback information indicates the negative acknowledgment associated with the second DCI based at least in part on the UE determining that the second DCI was not received based at least in part on a downlink assignment index associated with the second DCI.

In a thirteenth aspect, alone or in combination with one or more of the first through twelfth aspects, if the UE fails to decode the first DCI and the second DCI, the feedback codebook indicates a negative acknowledgment at the single position.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
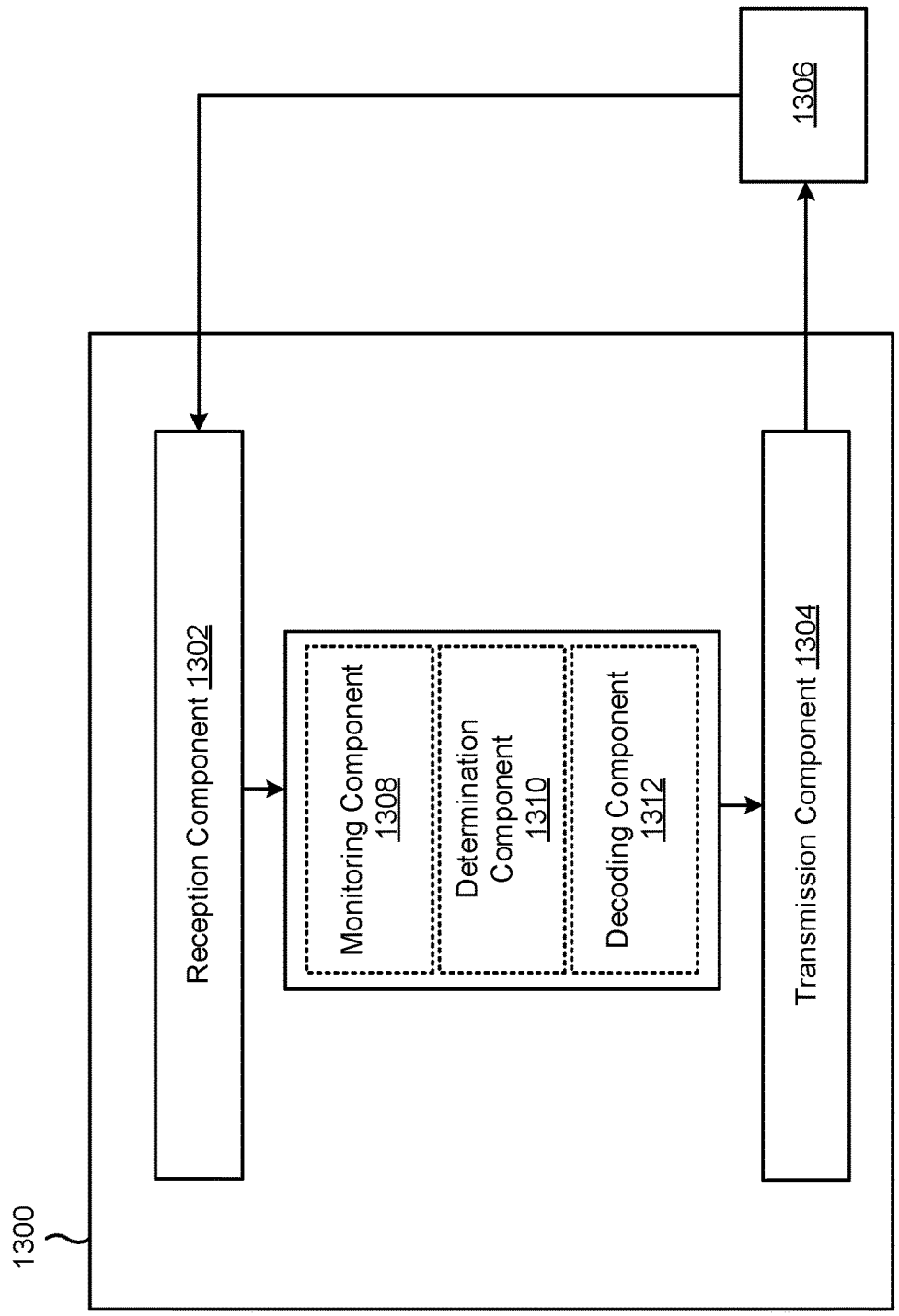
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a monitoring component 1308, a determination component 1310, or a decoding component 1312, among other examples.

In some aspects, the apparatus 1300 may be configured to perform one or more operations described herein in connection with FIGS. 3-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The monitoring component 1308 may monitor a first control channel candidate for first DCI scheduling a data channel and a second control channel candidate for second DCI scheduling the data channel, wherein the first control channel candidate and the second control channel candidate are associated with a control channel repetition scheme. In some aspects, the monitoring component 1308 may include one or more antennas, a demodulator, a MIMO detector, a receive processor, a controller/processor, a memory, or a combination thereof, of the UE described above in connection with FIG. 2. The transmission component 1304 may transmit a feedback codebook regarding the data channel based at least in part on monitoring the first control channel candidate and the second control channel candidate, wherein the feedback codebook includes one of a single position corresponding to the data channel, or a first position corresponding to the first DCI on the first control channel candidate and a second position corresponding to the second DCI on the second control channel candidate.

The determination component 1310 may determine an error case associated with the first DCI and the second DCI. In some aspects, the determination component 1310 may include one or more antennas, a demodulator, a MIMO detector, a receive processor, a controller/processor, a memory, or a combination thereof, of the UE described above in connection with FIG. 2.

The decoding component 1312 may successfully decode the first DCI and the second DCI, wherein the first feedback information and the second feedback information indicate a result of decoding the data channel. The decoding component 1312 may successfully decode the first DCI and the second DCI, wherein the first feedback information indicates a result of decoding the data channel and the second feedback information indicates a negative acknowledgment. The decoding component 1312 may successfully decode only the first DCI and not the second DCI, wherein the first feedback information indicates a result of decoding the data channel and the second feedback information indicates a negative acknowledgment associated with the second DCI. In some aspects, the decoding component 1312 may include one or more antennas, a demodulator, a MIMO detector, a receive processor, a controller/processor, a memory, or a combination thereof, of the UE described above in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
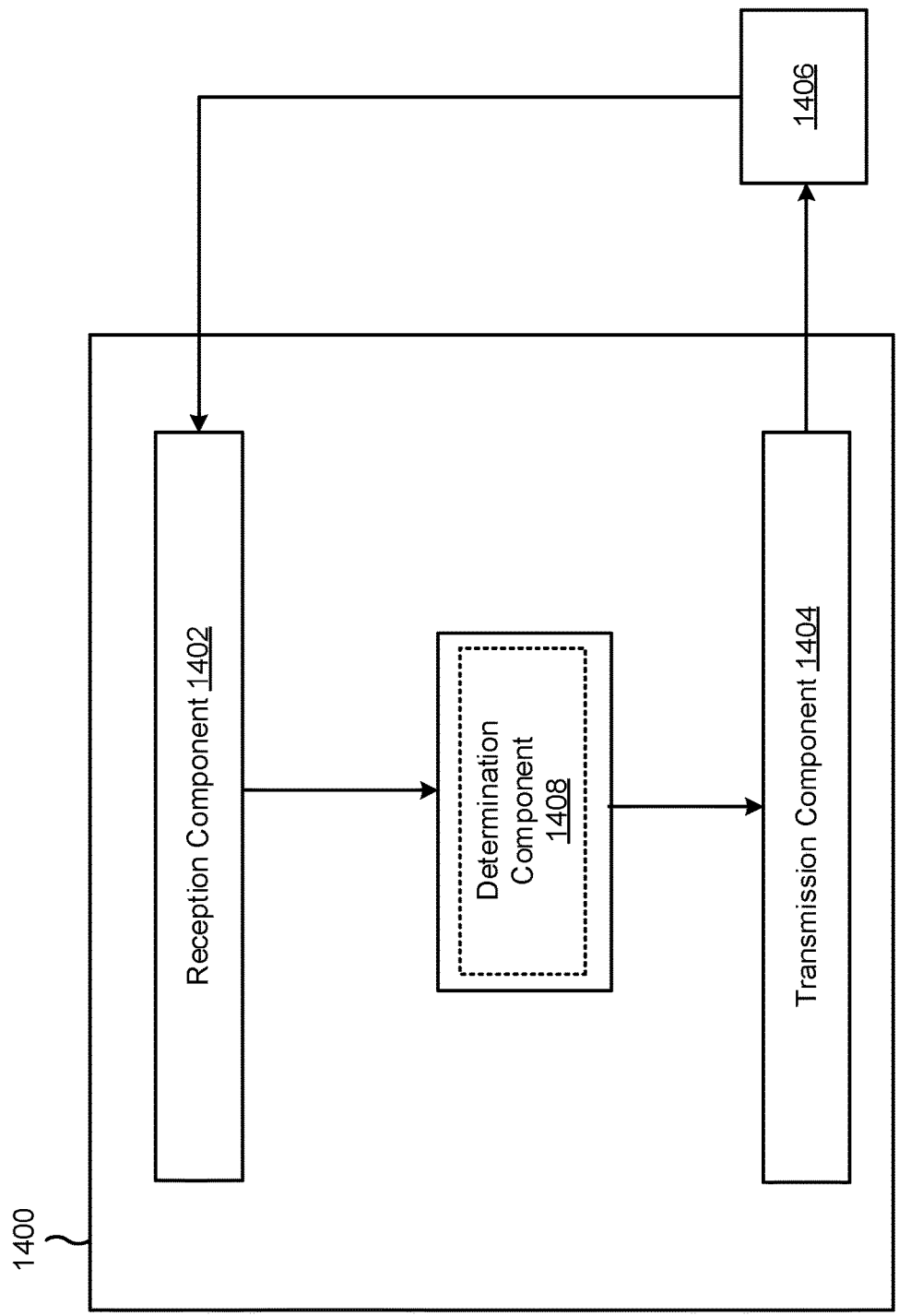

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 3-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, to a UE, first DCI and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme. The reception component 1402 may receive a feedback codebook regarding the data channel based at least in part on monitoring the first control channel candidate and the second control channel candidate, wherein the feedback codebook includes one of a single position corresponding to the data channel, or a first position corresponding to the first DCI on the first control channel candidate and a second position corresponding to the second DCI on the second control channel candidate. The determination component 1408 may determine an error case associated with the first DCI and the second DCI. In some aspects, the determination component 1408 may include one or more antennas, a modulator, a transmit MIMO processor, a receive processor, a controller/processor, a memory, or a combination thereof, of the base station described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: An apparatus of a user equipment (UE) for wireless communication, comprising a memory; and one or more processors coupled to the memory, the memory and the one or more processors configured to: monitor a first control channel candidate for first downlink control information (DCI) scheduling a data channel and a second control channel candidate for second DCI scheduling the data channel, wherein the first control channel candidate and the second control channel candidate are associated with a control channel repetition scheme; and transmit a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

Aspect 2: The apparatus of Aspect 1, wherein the first control channel candidate and the second control channel candidate are linked to each other.

Aspect 3: The apparatus of any of Aspects 1-2, wherein at least one of the first DCI or the second DCI is successfully decoded, and wherein the single position indicates acknowledgment information for the data channel.

Aspect 4: The apparatus of any of Aspects 1-3, wherein the first DCI indicates a different downlink assignment index than the second DCI, and wherein the feedback codebook omits feedback information regarding one of the first DCI or the second DCI based at least in part on the first DCI indicating a different downlink assignment index than the second DCI.

Aspect 5: The apparatus of any of Aspects 1-4, wherein, if the first DCI indicates a different downlink assignment index than the second DCI, the one or more processors are further configured to: determine an error case associated with the first DCI and the second DCI.

Aspect 6: The apparatus of any of Aspects 1-5, wherein, if the UE fails to decode the first DCI and the second DCI, the feedback codebook indicates a negative acknowledgment at the single position.

Aspect 7: The apparatus of any of Aspects 1-6, wherein the first DCI and the second DCI indicate a same downlink assignment index, and wherein the single position is associated with the same downlink assignment index.

Aspect 8: The apparatus of any of Aspects 1-7, wherein the single position of the feedback codebook uses an earlier control channel monitoring occasion, of a control channel monitoring occasion associated with the first control channel candidate and a control channel monitoring occasion associated with the second control channel candidate, as the reference control channel monitoring occasion.

Aspect 9: The apparatus of any of Aspects 1-8, wherein the single position of the feedback codebook uses a later control channel monitoring occasion, of a control channel monitoring occasion associated with the first control channel candidate and a control channel monitoring occasion associated with the second control channel candidate, as the reference control channel monitoring occasion.

Aspect 10: The apparatus of any of Aspects 1-9, wherein the first DCI indicates a first downlink assignment index and the second DCI indicates a second downlink assignment index, wherein the first position is associated with the first downlink assignment index and the second position is associated with the second downlink assignment index.

Aspect 11: The apparatus of any of Aspects 1-10, wherein the feedback codebook includes first feedback information at the first position and second feedback information at the second position.

Aspect 12: The apparatus any of Aspect 11, wherein the first feedback information and the second feedback information indicate a result of decoding the data channel based at least in part on the first DCI and the second DCI being successfully decoded.

Aspect 13: The apparatus of Aspect 11, wherein the first feedback information indicates a result of decoding the data channel and the second feedback information indicates a default value based at least in part on the first DCI and the second DCI being successfully decoded.

Aspect 14: The apparatus of Aspect 11, wherein the first feedback information indicates a result of decoding the data channel and the second feedback information indicates a negative acknowledgment associated with the second DCI based at least in part on only the first DCI and not the second DCI being successfully decoded.

Aspect 15: The apparatus of Aspect 14, wherein the second feedback information indicates the negative acknowledgment associated with the second DCI based at least in part on the UE determining that the second DCI was not received based at least in part on a downlink assignment index associated with the second DCI.

Aspect 16: An apparatus of a base station for wireless communication, comprising: a memory; and one or more processors coupled to the memory, the memory and the one or more processors configured to: transmit, to a user equipment (UE), first downlink control information (DCI) and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and receive a feedback codebook regarding the data channel based at least in part on monitoring the first control channel candidate and the second control channel candidate, wherein the feedback codebook includes one of: a single position corresponding to the data channel, wherein the single position is based at least in part on a reference control channel monitoring occasion for interpreting a downlink assignment index of the first DCI or the second DCI, or a first position corresponding to the first DCI on the first control channel candidate and a second position corresponding to the second DCI on the second control channel candidate.

Aspect 17: The apparatus of Aspect 16, wherein the first control channel candidate and the second control channel candidate are linked to each other.

Aspect 18: The apparatus of any of Aspects 16-17, wherein the single position indicates acknowledgment information for the data channel based at least in part on at least one of the first DCI or the second DCI being successfully decoded.

Aspect 19: The apparatus of any of Aspects 16-18, wherein the first DCI indicates a different downlink assignment index than the second DCI, and wherein the feedback codebook ignores one of the first DCI or the second DCI based at least in part on the first DCI indicating a different downlink assignment index than the second DCI.

Aspect 20: The apparatus of any of Aspects 16-19, wherein, if the first DCI and the second DCI are not successfully decoded, the feedback codebook indicates a negative acknowledgment at the single position.

Aspect 21: The apparatus of any of Aspects 16-20, wherein the first DCI and the second DCI indicate a same downlink assignment index, and wherein the single position is associated with the same downlink assignment index.

Aspect 22: The apparatus of any of Aspects 16-21, wherein the single position of the feedback codebook uses an earlier control channel monitoring occasion, of a control channel monitoring occasion associated with the first control channel candidate and a control channel monitoring occasion associated with the second control channel candidate, as the reference control channel monitoring occasion.

Aspect 23: The apparatus of any of Aspects 16-22, wherein the single position of the feedback codebook uses a later control channel monitoring occasion, of a control channel monitoring occasion associated with the first control channel candidate and a control channel monitoring occasion associated with the second control channel candidate, as the reference control channel monitoring occasion.

Aspect 24: The apparatus of any of Aspects 16-23, wherein the first DCI indicates a first downlink assignment index and the second DCI indicates a second downlink assignment index, wherein the first position is associated with the first downlink assignment index and the second DCI is associated with the second downlink assignment index.

Aspect 25: The apparatus of any of Aspects 16-24, wherein the feedback codebook includes first feedback information at the first position and second feedback information at the second position.

Aspect 26: The apparatus of Aspect 25, wherein the first feedback information indicates a result of decoding the data channel and the second feedback information indicates a negative acknowledgment associated with the second DCI based at least in part on only the first DCI and not the second DCI being decoded.

Aspect 27: A method of wireless communication comprising the operations of one or more of Aspects 1-30.

Aspect 28: A device for wireless communication, comprising a memory and one or more processors coupled to the memory, the one or more processors configured to perform the operations of one or more of Aspects 1-26.

Aspect 33: An apparatus for wireless communication, comprising at least one means for performing the operations of one or more of Aspects 1-26.

Aspect 34: A non-transitory computer-readable medium storing code for wireless communication, the code comprising instructions executable by a processor to perform the operations of one or more of Aspects 1-26.

Aspect 35: A non-transitory computer-readable medium storing a set of instructions for wireless communication, the set of instructions comprising one or more instructions that, when executed by one or more processors of a device, cause the device to perform the operations of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
   a one or more memories; and one or more processors coupled to the one or more memories, the one or more memories and the one or more processors configured to:
monitor a first control channel candidate for first downlink control information (DCI) scheduling a data channel and a second control channel candidate for second DCI scheduling the data channel, wherein the first control channel candidate and the second control channel candidate are associated with a control channel repetition scheme; and
transmit a feedback codebook regarding the data channel based at least in part on monitoring the first control channel candidate and the second control channel candidate, wherein the feedback codebook includes:
a single position corresponding to the data channel, wherein the single position is based at least in part on a reference control channel monitoring occasion for interpreting a downlink assignment index of the first DCI or the second DCI.

2. The apparatus of claim 1, wherein the first control channel candidate and the second control channel candidate are linked to each other.

3. The apparatus of claim 1, wherein at least one of the first DCI or the second DCI is successfully decoded, and wherein the single position indicates acknowledgment information for the data channel.

4. The apparatus of claim 1, wherein the first DCI indicates a different downlink assignment index than the second DCI, and wherein the feedback codebook omits feedback information regarding one of the first DCI or the second DCI based at least in part on the first DCI indicating a different downlink assignment index than the second DCI.

5. The apparatus of claim 1, wherein, if the first DCI indicates a different downlink assignment index than the second DCI, the one or more processors are further configured to:
determine an error case associated with the first DCI and the second DCI.

6. The apparatus of claim 1, wherein, if the UE fails to decode the first DCI and the second DCI, the feedback codebook indicates a negative acknowledgment at the single position.

7. The apparatus of claim 1, wherein the first DCI and the second DCI indicate a same downlink assignment index, and wherein the single position is associated with the same downlink assignment index.

8. The apparatus of claim 1, wherein the single position of the feedback codebook uses an earlier control channel monitoring occasion, of a control channel monitoring occasion associated with the first control channel candidate and a control channel monitoring occasion associated with the second control channel candidate, as the reference control channel monitoring occasion.

9. The apparatus of claim 1, wherein the single position of the feedback codebook uses a later control channel monitoring occasion, of a control channel monitoring occasion associated with the first control channel candidate and a control channel monitoring occasion associated with the second control channel candidate, as the reference control channel monitoring occasion.

10. The apparatus of claim 1, wherein the first DCI indicates a first downlink assignment index and the second DCI indicates a second downlink assignment index.

11. The apparatus of claim 1, wherein the first DCI indicates a first downlink assignment index and the second DCI indicates a second downlink assignment index.

12. An apparatus of a base station for wireless communication, comprising:
a one or more memories; and
one or more processors coupled to the one or more memories, the one or more memories and the one or more processors configured to:
transmit, to a user equipment (UE), first downlink control information (DCI) and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and
receive a feedback codebook regarding the data channel based at least in part on monitoring the first control channel candidate and the second control channel candidate, wherein the feedback codebook includes:
a single position corresponding to the data channel, wherein the single position is based at least in part on a reference control channel monitoring occasion for interpreting a downlink assignment index of the first DCI or the second DCI.

13. The apparatus of claim 12, wherein the first control channel candidate and the second control channel candidate are linked to each other.

14. The apparatus of claim 12, wherein the single position indicates acknowledgment information for the data channel based at least in part on at least one of the first DCI or the second DCI being successfully decoded.

15. The apparatus of claim 12, wherein the first DCI indicates a different downlink assignment index than the second DCI, and wherein the feedback codebook ignores one of the first DCI or the second DCI based at least in part on the first DCI indicating a different downlink assignment index than the second DCI.

16. The apparatus of claim 12, wherein, if the first DCI and the second DCI are not successfully decoded, the feedback codebook indicates a negative acknowledgment at the single position.

17. The apparatus of claim 12, wherein the first DCI and the second DCI indicate a same downlink assignment index, and wherein the single position is associated with the same downlink assignment index.

18. The apparatus of claim 12, wherein the single position of the feedback codebook uses an earlier control channel monitoring occasion, of a control channel monitoring occasion associated with the first control channel candidate and a control channel monitoring occasion associated with the second control channel candidate, as the reference control channel monitoring occasion.

19. The apparatus of claim 12, wherein the single position of the feedback codebook uses a later control channel monitoring occasion, of a control channel monitoring occasion associated with the first control channel candidate and a control channel monitoring occasion associated with the second control channel candidate, as the reference control channel monitoring occasion.

20. A method of wireless communication performed by a user equipment (UE), comprising:
monitoring a first control channel candidate for first downlink control information (DCI) scheduling a data channel and a second control channel candidate for second DCI scheduling the data channel, wherein the first control channel candidate and the second control channel candidate are associated with a control channel repetition scheme; and transmitting a feedback codebook regarding the data channel based at least in part on monitoring the first control channel candidate and the second control channel candidate, wherein the feedback codebook includes:

a single position corresponding to the data channel, wherein the single position is based at least in part on a reference control channel monitoring occasion for interpreting a downlink assignment index of the first DCI or the second DCI.

21. The method of claim 20, wherein the first control channel candidate and the second control channel candidate are linked to each other.

22. The method of claim 20, wherein at least one of the first DCI or the second DCI is successfully decoded, and wherein the single position indicates acknowledgment information for the data channel.

23. The method of claim 20, wherein the first DCI indicates a different downlink assignment index than the second DCI, and wherein the feedback codebook omits feedback information regarding one of the first DCI or the second DCI based at least in part on the first DCI indicating a different downlink assignment index than the second DCI.

24. The method of claim 20, wherein, if the first DCI indicates a different downlink assignment index than the second DCI, the method further comprises:

determining an error case associated with the first DCI and the second DCI.

25. The method of claim 20, wherein, if the UE fails to decode the first DCI and the second DCI, the feedback codebook indicates a negative acknowledgment at the single position.

26. The method of claim 20, wherein the first DCI and the second DCI indicate a same downlink assignment index, and wherein the single position is associated with the same downlink assignment index.

27. The method of claim 20, wherein the single position of the feedback codebook uses an earlier control channel monitoring occasion, of a control channel monitoring occasion associated with the first control channel candidate and a control channel monitoring occasion associated with the second control channel candidate, as the reference control channel monitoring occasion.

28. The method of claim 20, wherein the single position of the feedback codebook uses a later control channel monitoring occasion, of a control channel monitoring occasion associated with the first control channel candidate and a control channel monitoring occasion associated with the second control channel candidate, as the reference control channel monitoring occasion.

29. A method of wireless communication performed by a base station, comprising:

transmitting, to a user equipment (UE), first downlink control information (DCI) and second DCI scheduling a data channel, wherein the first DCI is transmitted on a first control channel candidate and the second DCI is transmitted on a second control channel candidate, wherein the first control channel candidate and the second control channel candidate are associated with a control channel repetition scheme; and receiving a feedback codebook regarding the data channel based at least in part on monitoring the first control channel candidate and the second control channel candidate, wherein the feedback codebook includes:

a single position corresponding to the data channel, wherein the single position is based at least in part on a reference control channel monitoring occasion for interpreting a downlink assignment index of the first DCI or the second DCI.

30. The method of claim 29, wherein the first control channel candidate and the second control channel candidate are linked to each other.

* * * * *